(12) United States Patent
Oishi et al.

(10) Patent No.: US 8,834,035 B2
(45) Date of Patent: Sep. 16, 2014

(54) ROLLER BEARING RETAINER AND NEEDLE ROLLER BEARING

(75) Inventors: Shinji Oishi, Iwata (JP); Yugo Yoshimura, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 407 days.

(21) Appl. No.: 12/810,618

(22) PCT Filed: Dec. 19, 2008

(86) PCT No.: PCT/JP2008/073196
§ 371 (c)(1),
(2), (4) Date: Jun. 25, 2010

(87) PCT Pub. No.: WO2009/084478
PCT Pub. Date: Jul. 9, 2010

(65) Prior Publication Data
US 2010/0278471 A1   Nov. 4, 2010

(30) Foreign Application Priority Data

Dec. 27, 2007 (JP) ................. 2007-336935
Dec. 27, 2007 (JP) ................. 2007-336936
Dec. 27, 2007 (JP) ................. 2007-336937
Dec. 27, 2007 (JP) ................. 2007-336940
Jan. 8, 2008 (JP) ................. 2008-001393

(51) Int. Cl.
| F16C 33/48 | (2006.01) |
| F16C 19/44 | (2006.01) |
| B21D 53/12 | (2006.01) |
| F16C 33/54 | (2006.01) |
| F16C 19/46 | (2006.01) |

(52) U.S. Cl.
CPC ............. *F16C 33/54* (2013.01); *B21D 53/12* (2013.01); *F16C 19/46* (2013.01)

USPC .......................... 384/572; 384/548

(58) Field of Classification Search
USPC ............ 384/572, 575, 580, 623; 29/898.065, 29/898.067
See application file for complete search history.

(56) References Cited

U.S. PATENT DOCUMENTS 5,647,674 A * 7/1997 Ohashi et al. ............ 384/580
6,421,917 B1 * 7/2002 Muntnich et al. ........ 29/898.067

(Continued)

FOREIGN PATENT DOCUMENTS

| JP | 7103320 A | 4/1995 |
| JP | 8312650 A | 11/1996 |

(Continued)

OTHER PUBLICATIONS

Translation of JP 2000-018258, obtained on Oct. 25, 2012.*

(Continued)

*Primary Examiner* — Alan B Waits
*Assistant Examiner* — Brian McGovern
(74) *Attorney, Agent, or Firm* — Clark & Brody

(57) ABSTRACT

A roller bearing retainer (13) includes a pair of annular ring parts (14) and a plurality of column parts (15) each including a column center part (16) provided in an axial center region so as to be positioned relatively on the radial inner side, a pair of column end parts (17) provided in axial end regions so as to be positioned relatively on the radial outer side, and a pair of column sloped parts (18) positioned between the column center part (16) and the pair of column end parts (17), and connecting the pair of ring parts to each other. A thickness of each part of the column center part, the pair of column end parts, and the pair of column sloped parts is smaller than a thickness of a boundary part between the adjacent parts.

17 Claims, 26 Drawing Sheets

(56) References Cited

U.S. PATENT DOCUMENTS

| | | | |
|---|---|---|---|
| 2003/0198417 A1* | 10/2003 | Yamamoto et al. | 384/492 |
| 2004/0252926 A1* | 12/2004 | Tajima | 384/544 |
| 2007/0154127 A1* | 7/2007 | Oishi et al. | 384/569 |

FOREIGN PATENT DOCUMENTS

| | | | | |
|---|---|---|---|---|
| JP | 2000018258 A | * | 1/2000 | F16C 33/46 |
| JP | 2000205273 A | | 7/2000 | |
| JP | 2000213546 A | | 8/2000 | |
| JP | 2000257638 A | | 9/2000 | |
| JP | 2001-047127 | | 2/2001 | |
| JP | 2001516644 T | | 10/2001 | |
| JP | 2001314921 A | | 11/2001 | |
| JP | 2003-004051 | | 1/2003 | |
| JP | 2004232726 A | | 8/2004 | |
| JP | 2005076732 A | | 3/2005 | |
| JP | 2005233317 A | | 9/2005 | |
| JP | 2005344852 A | | 12/2005 | |
| JP | 2006-017244 | | 1/2006 | |
| JP | 2006-046391 | * | 2/2006 | F16C 33/46 |
| JP | 2006052813 A | | 2/2006 | |
| JP | 2007040449 A | | 2/2007 | |

OTHER PUBLICATIONS

Translation of JP 2007-040449, obtained on Oct. 25, 2012.*
Translation of JP 2006-046391, obtained Jun. 6, 2013.*
Translation of JP 2001-314921, obtained Jun. 12, 2013.*
Translation of JP 2007-040449, obtained Jun. 13, 2013.*

* cited by examiner

FIG. 5
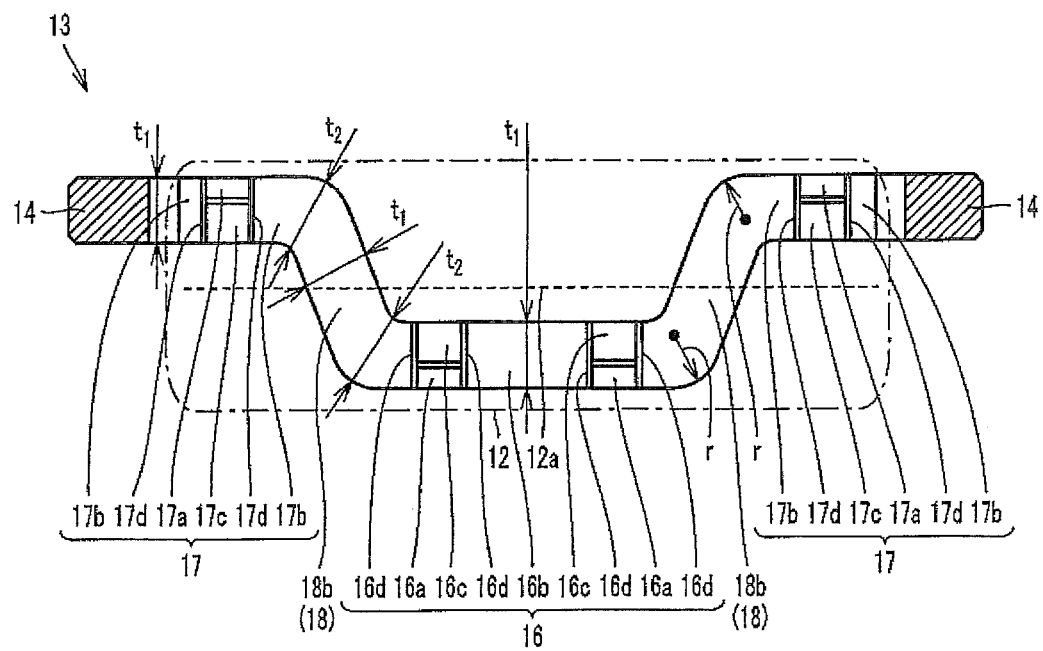
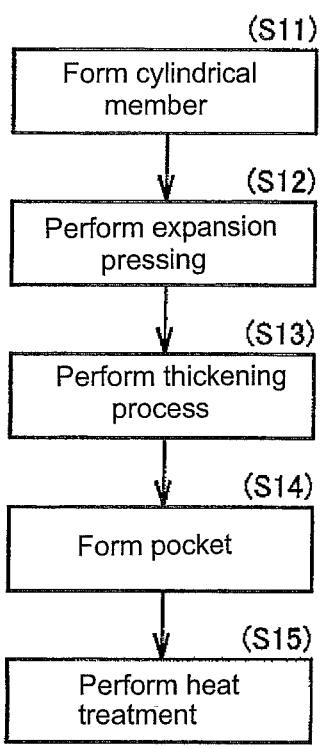
FIG. 6

ROLLER BEARING RETAINER AND NEEDLE ROLLER BEARING

TECHNICAL FIELD

The present invention relates to a roller bearing retainer produced by a pressing process, and a needle roller bearing including the roller bearing retainer.

BACKGROUND ART

A cage & roller type of needle roller bearing composed of rollers and a retainer is employed as an idler bearing of a car transmission, and a bearing for a connecting rod large end of a motorcycle engine in many cases. Such bearing is disclosed in Japanese Unexamined Patent Publication No. 2000-257638 (Patent Document 1), for example.

According to this document, a pipe-shaped material is formed into an annular member having an M-shaped cross section by a bulging process, and pockets to hold rollers are formed in the annular member, whereby a roller bearing retainer light in weight and large in load capacity can be provided.

The roller bearing retainer having the above constitution is guided on the outer diameter side in which a column end part and a housing are in contact with each other at the time of rotation, in many cases. Here, when a surface area of an outer diameter surface of the column end part being in contact with the housing is small, the contact part could be abraded and burned.

In addition, the pocket is formed between adjacent column parts. The column part is composed of a column center part, the column end part, and a column sloped part. A circumferential interval between the adjacent column center parts or the adjacent column end parts is set to be smaller than a roller diameter of a roller, and a circumferential interval between the adjacent column sloped parts is set to be larger than the roller diameter of the roller. Thus, it is reported that the roller can be effectively prevented from dropping out of the retainer without providing a projection at a wall surface of the column part opposed to the pocket.

When the roller bearing retainer is formed by the method disclosed in the above document, the thickness of bend parts such as a boundary part between the column center part and the column sloped part, a boundary part between the column sloped part and the column end part, and a boundary part between the column end part and an annular side part is thinner than that of the pipe-shaped material. Since stress applied to the retainer at the time of the rotation of the bearing concentrates on the bend part, the roller bearing retainer could be easily damaged because the bend part is thinned.

In addition, when the roller bearing retainer is formed by the method disclosed in the above document, since the curvature radius of the bend parts such as the boundary part between the column center part and the column sloped part, the boundary part between the column sloped part and the column end part, and the boundary part between the column end part and the annular side part is larger than that of the retainer, the length of a linear part of the column end part cannot be longer.

In addition, according to the roller bearing retainer disclosed in the above document, when the roller has a small diameter, it is difficult to prevent the roller from dropping out. Meanwhile, when the circumferential interval between the adjacent column parts is reduced in order to prevent the roller from dropping out of the retainer for sure, the play amount of the roller cannot be sufficiently provided.

DISCLOSURE OF THE INVENTION

Thus, it is an object of the present invention to provide a roller bearing retainer in which strength of a bend part is enhanced, and a needle roller bearing provided with such roller bearing retainer.

It is another object of the present invention to provide a roller bearing retainer in which a surface area of a part brought in sliding contact with a peripheral member (a housing, a rotation shaft and the like) is increased.

It is still another object of the present invention to provide a roller bearing retainer in which strength of a bend part is enhanced and a roller can be appropriately retained.

It is still another object of the present invention to provide a roller bearing retainer in which strength of a bend part is enhanced and lubrication performance is high.

A roller bearing retainer includes a pair of annular ring parts, and a plurality of column parts each including a column center part provided in an axial center region so as to be positioned relatively on the radial inner side, a pair of column end parts provided in axial end regions so as to be positioned relatively on the radial outer side, and a pair of column sloped parts positioned between the column center part and the pair of column end parts, and connecting the pair of ring parts to each other. Thus, a thickness of each part of the column center part, the pair of column end parts, and the pair of column sloped parts is smaller than a thickness of a boundary part between the adjacent parts.

According to the above constitution, the strength of the boundary part is relatively improved. As a result, the retainer can be prevented from being damaged due to the stress concentration. In addition, the "thickness" in this specification means the thickness dimension between an inner diameter surface and an outer diameter surface.

Preferably, the thickness of each part of the column center part, the pair of column end part, and the pair of column sloped parts is larger than a curvature radius of the boundary part between the adjacent parts. Thus, a surface area of the part brought in contact with the peripheral member can be increased. As a result, a contact surface pressure can be reduced and the abrasion and burning can be prevented.

Preferably, the roller bearing retainer is formed from a steel plate containing 0.15% to 1.1% by weight of carbon. Here, according to a steel plate containing less than 0.15% by weight of carbon, it is difficult to ensure the strength required for the roller bearing retainer. Meanwhile, according to a steel plate containing more than 1.1% by weight of carbon, its processability is considerably lowered. Therefore, it is preferable that the carbon content is within the above range.

Preferably, the roller bearing retainer is produced through a step of forming the pair of column end parts by expanding an axial each end of a cylindrical member having a diameter substantially equal to that of the column center part, and a step of thickening the boundary part by axially compressing the cylindrical member.

Preferably, the thickness of the pair of column end parts is smaller than the thickness of the column center part. Thus, the oil lubrication property in an axial direction can be improved.

As another embodiment, the roller bearing retainer further includes a flange part extending from each of the pair of ring parts toward the radial inner side. A thickness of the pair of ring parts and the flange part is smaller than a thickness of a boundary part between the ring part and the flange part.

A needle roller bearing according to the present invention includes a plurality of needle rollers, and any one of roller bearing retainer described in the above in which a pocket to house the roller is provided between the adjacent column parts. When the above-described roller bearing retainer is employed, the needle roller bearing can be highly reliable.

According to the present invention, the roller bearing retainer has high strength by making the boundary part thicker than the other parts. In addition, when the above roller bearing retainer is employed, the needle roller bearing can be highly reliable.

Preferably, surface roughness Ra of an outer diameter surface of the pair of ring parts and an outer diameter surface of the pair of column end parts is 0.05 μm to 0.3 μm. Thus, the abrasion due to the contact with the peripheral member can be prevented. In addition, the "surface roughness Ra" means arithmetic average roughness.

Preferably, the retainer is produced through a step of forming a cylindrical member having a diameter substantially equal to that of the column center part, from a steel plate by a deep-drawing process, and a step of forming the pair of column end parts by expanding a diameter of an axial each end of the cylindrical member.

According to another embodiment, the roller bearing retainer further includes a flange part extending from each of the pair of ring parts toward the radial inner side. A thickness of the pair of ring parts and the flange part is larger than a curvature radius of a boundary part between the ring part and the flange part.

Preferably, the column part has a roller stopper part at a wall surface opposed to a pocket to hold a roller to prevent the roller from dropping out. Thus, even when the roller has a small diameter, the roller can be effectively prevented from dropping out of the retainer. In addition, the "thickness" in this specification means the thickness dimension between the inner diameter surface and the outer diameter surface.

Preferably, the wall surfaces of the adjacent column parts opposed across the pocket are parallel to each other. Thus, the roller can roll stably.

Further preferably, the roller stopper part includes a first roller stopper part projecting from the column center part to prevent the roller from dropping out toward the radial inner side, and a second roller stopper part projecting from each of the pair of column end parts to prevent the roller from dropping out toward the radial outer side, and a recess part extending in a radial direction is provided on axial each side of the first and second roller stopper parts. Thus, the radial oil lubrication property can be improved.

Further preferably, a non-contact part opposed to the roller so as to be spaced therefrom by a predetermined clearance is provided at a region adjacent to each of the first and second roller stopper parts in the radial direction, and the non-contact part is sloped such that the predetermined clearance is increased as a distance from each of the first and second roller stopper parts is increased. Thus, the lubricant oil can largely flow into the first and second roller stopper parts. As a result, the oil film at the first and second roller stopper parts can be prevented from being cut. As one embodiment, the roller stopper part is formed by an ironing process.

According to one embodiment, an outer diameter surface of the pair of column end parts is connected to the pair of ring parts through a stepped part such that the outer diameter surface of the column end part is positioned on the radial inner side as compared with an outer diameter surface of the ring part. Thus, when the stepped part is formed, the space to hold the lubricant oil is formed at the region on the radial outer side of the retainer. When the lubricant oil is supplied from this region to each part of the bearing, the lubrication performance of the retainer can be enhanced.

According to one embodiment, the retainer has a plurality of pockets formed in a peripheral surface of the cylindrical member by a punching process, and a roller stopper part formed by an ironing process at a wall surface opposed to the pocket between the pair of column parts, and the stepped part is positioned on the axial outer side as compared with the roller stopper part.

A needle roller bearing according to a preferred embodiment includes the retainer having any one of the characteristics described in the above, and a plurality of needle rollers contained in pockets of the retainer. The needle roller is in contact with the wall surface of the column part opposed to a rolling surface of the needle roller, over 50% or more of an effective length of the needle roller. Thus, when the contact area between the needle roller and the column part is increased, the contact surface pressure at the contact part can be reduced. As a result, the needle roller can be prevented from skewing and the abrasion and burning at the wall surface can be prevented. In addition, the "effective length of the needle roller" in this specification means the axial length of the needle roller except for the chamfered part at axial each end.

Preferably, the wall surface of the column part opposed to the rolling surface of the needle roller has a roller stopper part projecting from the wall surface, a non-contact part provided at the region radially adjacent to the roller stopper part so as to retreat from the wall surface and opposed to the needle roller with a predetermined clearance, and a guide surface brought in contact with the needle roller at the region axially adjacent to the roller stopper part. Thus, since the needle roller is in contact with the region axially adjacent to the roller stopper part, the contact area between the needle roller and the column part can be increased as compared with a conventional welded retainer in which the guide surface is provided at the region radially adjacent to the roller stopper part.

Further preferably, the wall surface of the column part opposed to the rolling surface of the needle roller has a recess part retreating from the non-contact part and extending in the radial direction, at axial each end of the roller stopper part. Thus, the oil lubrication property in a radial direction can be improved. According to one embodiment, the non-contact part is sloped such that the predetermined clearance is increased with the radial distance from the roller stopper part.

Further preferably, a pitch circle of the plurality of needle rollers is positioned on the radial inner side as compared with an outer diameter surface of the column center part, and positioned on the radial outer side as compared with an inner diameter surface of the column end part. Thus, the needle roller can be in contact with each of the column center part, the column end part, and the column sloped part. As a result, the contact area between the needle roller and the column part can be increased.

BRIEF DESCRIPTION OF THE DRAWINGS

FIG. 5 is a view showing a variation of the roller bearing retainer shown in FIG. 1 and corresponding to FIG. 4;

FIG. 6 is a flowchart showing main production steps of the roller bearing retainer shown in FIG. 1;

BEST MODE FOR CARRYING OUT THE INVENTION

Figure 1:
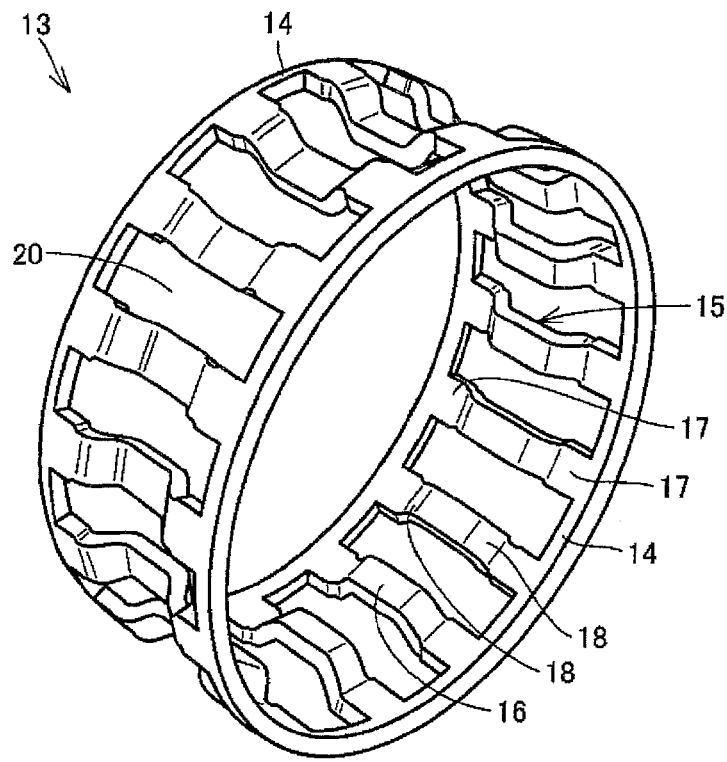
FIG. 1 is a perspective view showing a roller bearing retainer according to one embodiment of the present invention.
Figure 3:
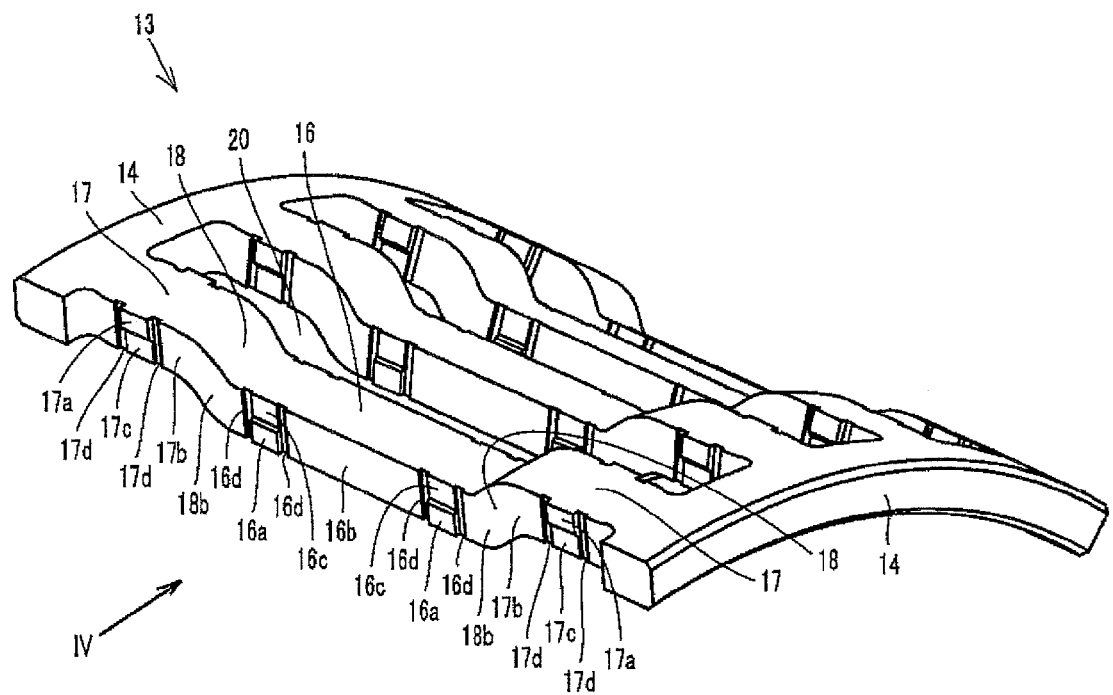
FIG. 3 is a perspective view showing a structure of a pocket of the roller bearing retainer shown in FIG. 1.
Figure 4:
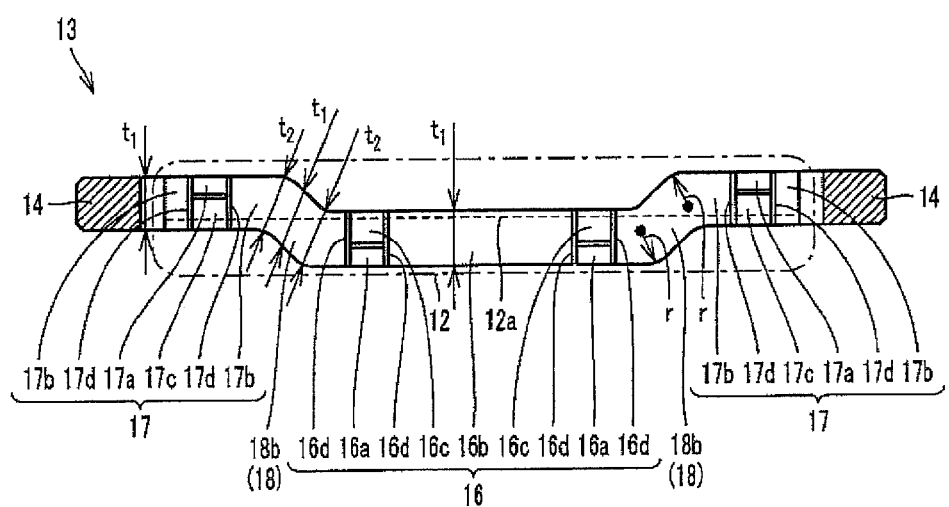
FIG. 4 is a sectional view taken from an arrow IV in FIG. 3.
Figure 7:
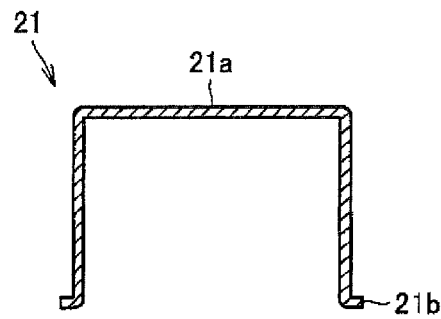
FIG. 7 is a view showing a deep drawing step.

A description will be made of a needle roller bearing 11 and a roller bearing retainer 13 (referred to as the "retainer 13" simply hereinafter) according to one embodiment of the present invention, with reference to FIGS. 1 to 4. In addition, FIG. 1 is a perspective view showing the retainer 13, FIG. 2 is a perspective view showing the needle roller bearing 11, FIG. 3 is a perspective view showing a configuration of a column part 15 of the retainer 13, and FIG. 4 is a sectional view taken from a direction of an arrow IV in FIG. 3.

Figure 2:
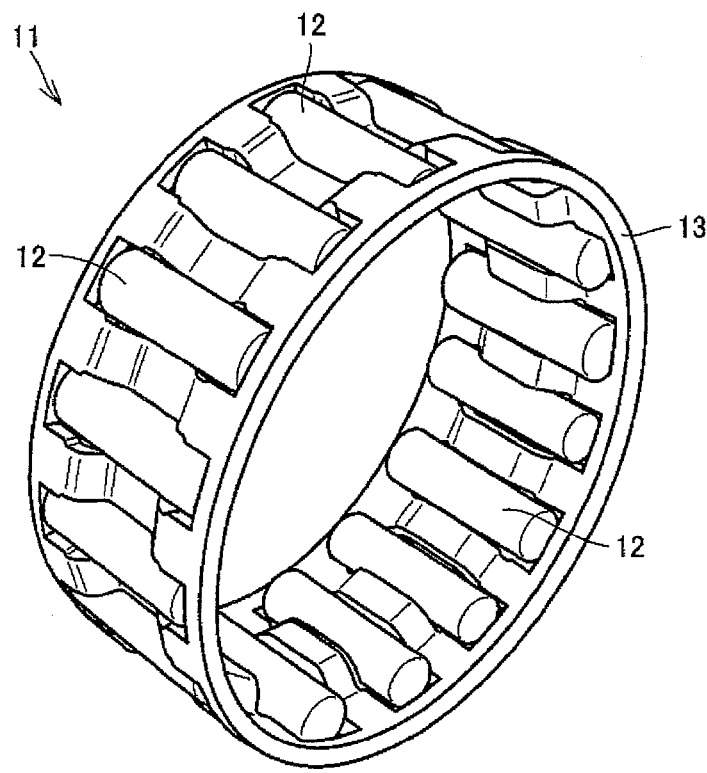
FIG. 2 is a perspective view showing a needle roller bearing used in the roller bearing retainer shown in FIG. 1.

First, referring to FIG. 2, the needle roller bearing 11 includes a plurality of needle rollers 12, and the retainer 13 retaining the plurality of needle rollers 12. Next, referring to FIG. 1, the retainer 13 includes a pair of annular ring parts 14, and the plurality of column parts 15 connecting the pair of ring parts 14 to each other. In addition, a pocket 20 to hold the needle roller 12 is formed between the adjacent column parts 15.

In addition, the "annular ring part" in this specification means only an integrated ring part continued in a circumferential direction. More specifically, it is to be noted that the above ring part does not include a ring part in which both ends are bonded by welding and the like.

The column part 15 includes a column center part 16 positioned in an axial center region on the radial relatively-inner side, a pair of column end parts 17 positioned in axial end regions on the radial relatively-outer side, and a pair of column sloped parts 18 positioned between the column center part 16 and the pair of column end parts 17.

Next, referring to FIGS. 3 and 4, a wall surface of the column part 15 opposed to the pocket 20 is provided with first and second roller stopper parts 16a and 17a to prevent the needle roller 12 from dropping out, guide surfaces 16b, 17b, and 18b to guide the rotation of the needle roller 12, non-contact parts 16c and 17c, and oil grooves 16d and 17d.

The two first roller stopper parts 16a are provided in the column center part 16. More specifically, the first roller stopper parts 16a are located on the radial inner side of the wall surface of the column center part 16 opposed to the pocket 20. Thus, the needle roller 12 is prevented from dropping out toward the radial inner side.

The second roller stopper part 17a is provided in each of the pair of column end parts 17. More specifically, the second roller stopper part 17a is located on the radial outer side of the wall surface of the column end part 17 opposed to the pocket 20. Thus, the needle roller 12 is prevented from dropping out toward the radial outer side.

Thus, since the first and second roller stopper parts 16a and 17a are provided, even when the needle roller 12 has a small diameter, the needle roller 12 can be effectively prevented from dropping out of the retainer 13 while the play amount of the needle roller 12 is sufficiently ensured.

The guide surfaces 16b, 17b, and 18b are provided so as to be axially adjacent to the first and second roller stopper parts 16a and 17a. More specifically, the guide surface 16b is provided so as to be axially adjacent to the first roller stopper part 16a of the column center part 16. The guide surface 17b is provided so as to be axially adjacent to the second roller stopper part 17a of the column end part 17. The guide surface 18b is provided over the whole region of the column sloped part 18. In addition, the guide surfaces 16b, 17b, and 18b are provided in the same plane. In addition, the guide surfaces 16b, 17b, and 18b opposed across the pocket 20 are parallel to each other. Thus, the needle roller 12 can roll stably.

Here, according to the conventional welded retainer, the guide surface is provided in the region radially adjacent to the roller stopper part, that is, in the region corresponding to the non-contact parts 16c and 17c as will be described below in the present invention. Meanwhile, according to the present invention, the needle roller 12 is in contact with the regions axially adjacent to the first and second roller stopper parts 16a and 17a, that is, the guide surfaces 16b and 18b larger than the non-contact parts 16c and 17c. Therefore, the contact area between the needle roller 12 and the column part 15 can be increased.

The non-contact parts 16c and 17c are provided in the region radially adjacent to the first and second roller stopper parts 16a and 17a. The non-contact parts 16c and 17c retreat from the guide surfaces 16b, 17b, and 18b, and are opposed to the needle roller 12 so as to be spaced therefrom by a predetermined clearance. The non-contact parts 16c and 17c are sloped such that the predetermined clearance is increased as the distance from the first and second roller stopper parts 16a and 17a is increased.

More specifically, the non-contact 16c is provided in the region on the radial outer side of the first roller stopper part 16a and sloped such that the clearance from the needle roller 12 is increased toward the radial outer side. Similarly, the non-contact part 17c is provided in the region on the radial inner side of the second roller stopper part 17a and sloped such that the clearance from the needle roller 12 is increased toward the radial inner side.

Thus, an amount of lubricant oil flowing into the first and second roller stopper parts 16a and 17a is increased. As a result, an oil film on the first and second roller stopper parts 16a and 17a is prevented from being cut.

The oil grooves 16d and 17d are provided on axial both sides of the first and second roller stopper parts 16a and 17a. The oil grooves 16d and 17d extend in the radial direction and further retreat from the non-contact parts 16c and 17c. Thus, the amount of the lubricant oil flowing in the radial direction can be increased, so that a radial oil lubrication property of the retainer 13 can be improved. In addition, since the lubricant oil overflowing from the oil grooves 16d and 17d is supplied to the adjacent first and second roller stopper parts 16a and 17b and the guide surfaces 16b, 17b, and 18b, the oil film on the first and second roller stopper parts 16a and 17a and the like can be prevented from being cut.

According to the above column part 15, a thickness "$t_1$" of the column center part 16, the column end part 17, and the column sloped part 18 (referred to as the "linear part" collectively hereinafter) is set to be the same substantially. Meanwhile, a thickness "$t_2$" of a boundary part between the column center part 16 and the column sloped part 18, and a boundary part between the column end part 17 and the column sloped part 18 (referred to as the "boundary part" collectively hereinafter) is thicker than the thickness "$t_1$" of the linear part ($t_1 < t_2$). Thus, the strength of the boundary part can be relatively enhanced. As a result, even when the stress at the time of bearing rotation is concentrated on the boundary part, the retainer 13 can be effectively prevented from being damaged.

In addition, the thickness "$t_1$" of the linear part and a curvature radius "r" have a relation of $r < t_1$. When the curvature radius "r" of the boundary part is small, the axial length of the linear part adjacent to the boundary part can be longer, that is, the surface area of the linear part can be increased. As a result, a contact surface pressure can be decreased at the time of the bearing rotation.

More specifically, when the retainer 13 is guided on the outer diameter side (on a housing), the outer diameter surface of the column end part 17 is in contact with the housing (not shown). Thus, when the curvature radius "r" of the boundary part at least between the column end part 17 and the column sloped part 18 is within the above range, the contact surface pressure between the outer diameter surface of the column end part 17 and the housing can be reduced.

In addition, surface roughness Ra of the outer diameter surfaces of the ring part 14 and the column end part 17 is set to be not less than 0.05 μm and not more than 0.3 μm. Thus, abrasion caused by the contact between the outer diameter surfaces of the ring part 14 and the column end part 17, and the housing can be prevented. In addition, the "surface roughness Ra" means arithmetic average roughness.

Meanwhile, when the retainer 13 is guided on the inner diameter side (on a rotation shaft), the inner diameter surface of the column center part 16 is in contact with the rotation shaft (not shown). Thus, when the curvature radius r of the boundary part at least between the column center part 16 and the column sloped part 18 is within the above range, the contact surface pressure between the inner diameter surface of the column center part 16 and the rotation shaft can be reduced. In addition, in this case, surface roughness Ra of the inner diameter surface of the column center part 16 is set to be not less than 0.05 μm and not more than 0.3 μm.

In addition, at the boundary part, a round part is formed on a projection side (to which a tensile stress is applied at a bending process) and on a recess side (to which a compression stress is applied at the bending process). Here, the curvature radius of the projection side is always larger than the curvature radius of the recess side. Thus, it is assumed that the "curvature radius r of the boundary part" designates the curvature radius of the projection side in this specification. In addition, it is assumed that the "thickness $t_2$ of the boundary part" designates a length of a line connecting the center part of the projection side and the center part of the recess side.

In addition, the outer diameter surface of the column center part 16 is positioned on the radial outer side as compared with the inner diameter surface of the column end part 17. A pitch circle 12a of the needle roller 12 is positioned on the radial inner side as compared with the outer diameter surface of the column center part 16, and on the radial outer side as compared with the inner diameter surface of the column end part 17. Thus, the needle roller 12 is in contact with each of the guide surfaces 16b, 17b, and 18b. Thus, as the contact surface between the needle roller 12 and the guide surfaces 16b, 17b, and 18b is increased, the needle roller 12 can be effectively prevented from skewing.

However, the positional relation between the column center part 16 and the column end part 17 is not limited to the above case. A variation of the retainer 13 will be described with reference to FIG. 5. In addition, FIG. 5 is a view showing the variation of the retainer 13 and corresponds to FIG. 4. In addition, as for the component having the same configuration and function as the above, the same reference numeral is allotted to the component and its description will be omitted.

Referring to FIG. 5, the outer diameter surface of the column center part 16 is positioned radial inner side as compared with the inner diameter surface of the column end part 17. The pitch circle 12a of the needle roller 12 is positioned on the radial outer side as compared with the outer diameter surface of the column center part 16, and on the radial inner side as compared with the inner diameter surface of the column end part 17. In this case, the needle roller 12 is guided only on the guide surface 18b of the column sloped part 18. In this constitution, since the first roller stopper part 16a and the second roller stopper part 17a are apart from each other in a radial direction, the needle roller 12 can be appropriately prevented from dropping out.

Figure 15:
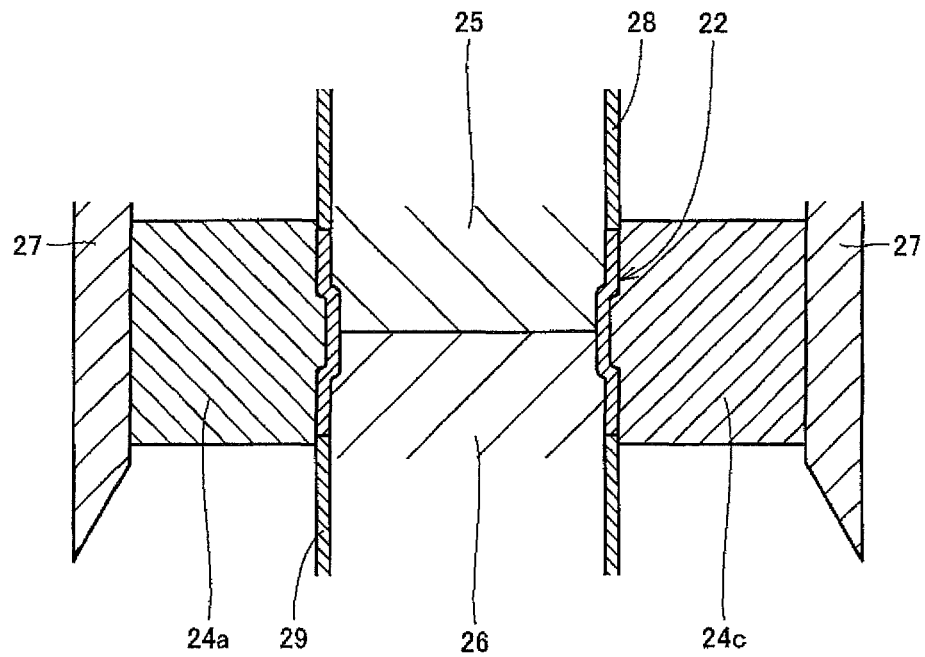
FIG. 15 is a view showing a thickening process step.
Figure 16:
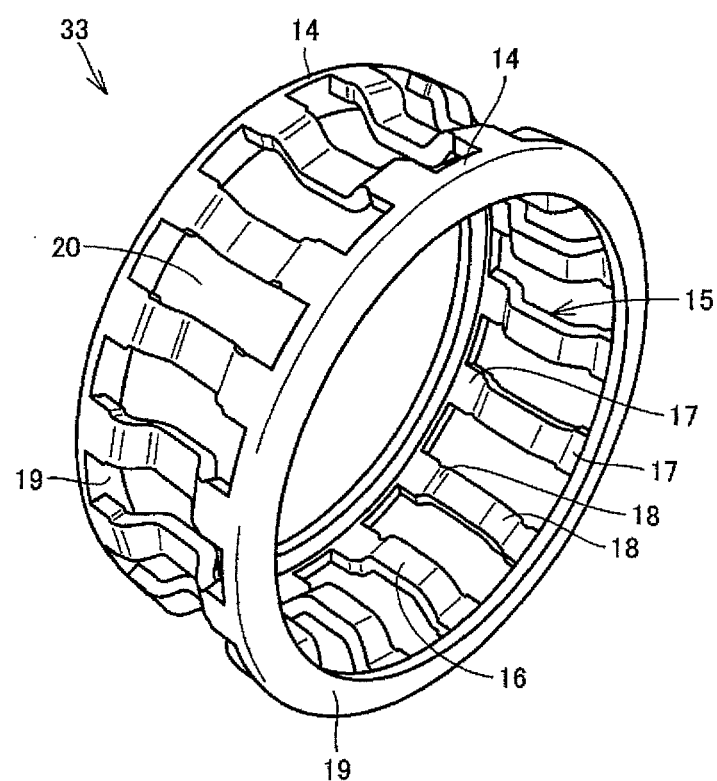
FIG. 16 is a perspective view showing a roller bearing retainer according to another embodiment of the present invention.
Figure 17:
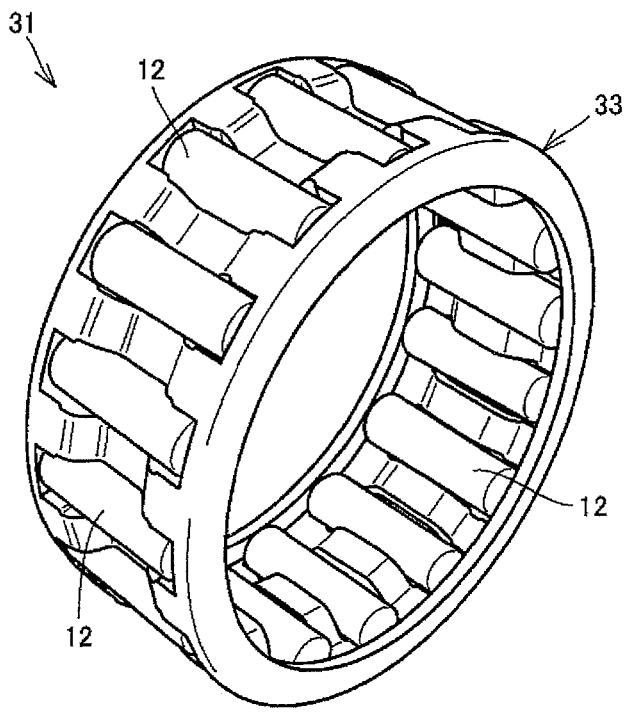
FIG. 17 is a perspective view showing a needle roller bearing used in the roller bearing retainer shown in FIG. 16.
Figure 18:
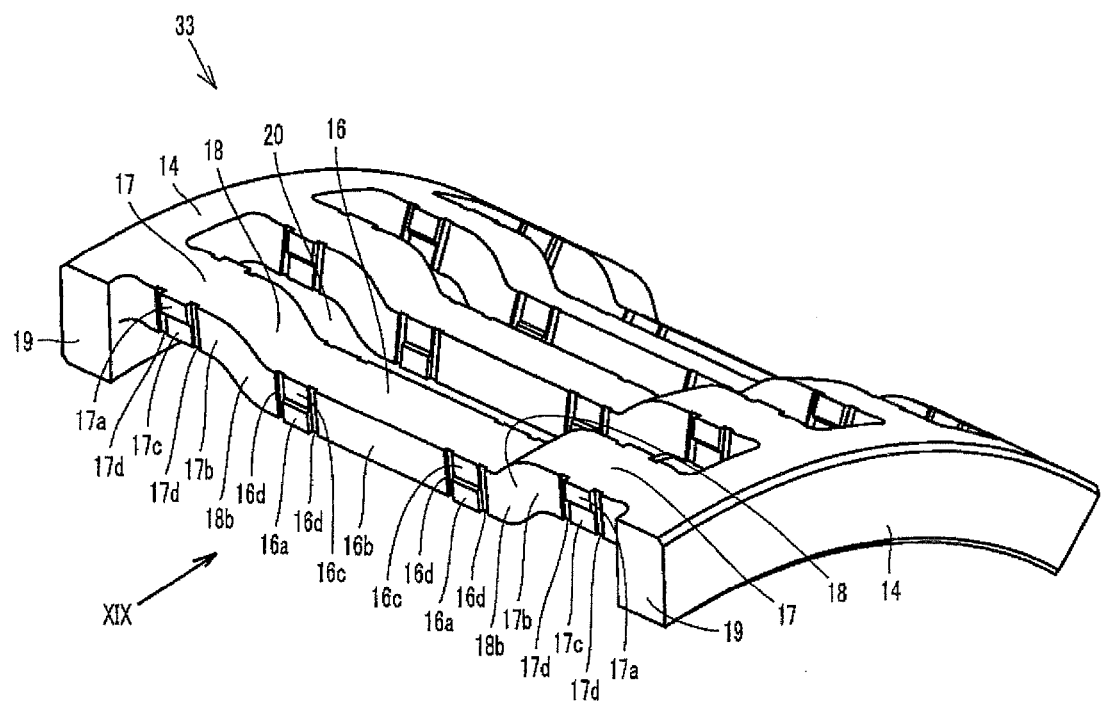
FIG. 18 is a perspective view showing a structure of a pocket of the roller bearing retainer shown in FIG. 16.
Figure 19:
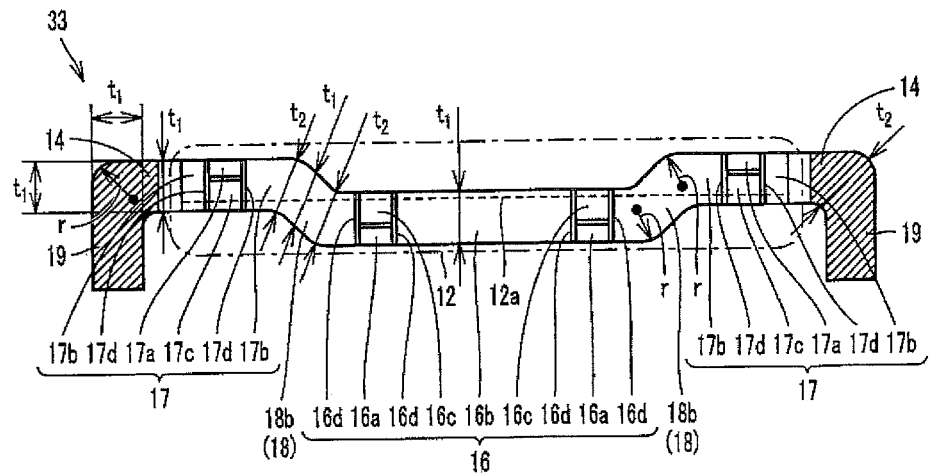
FIG. 19 is a view taken from an arrow XIX in FIG. 18.
Figure 20:
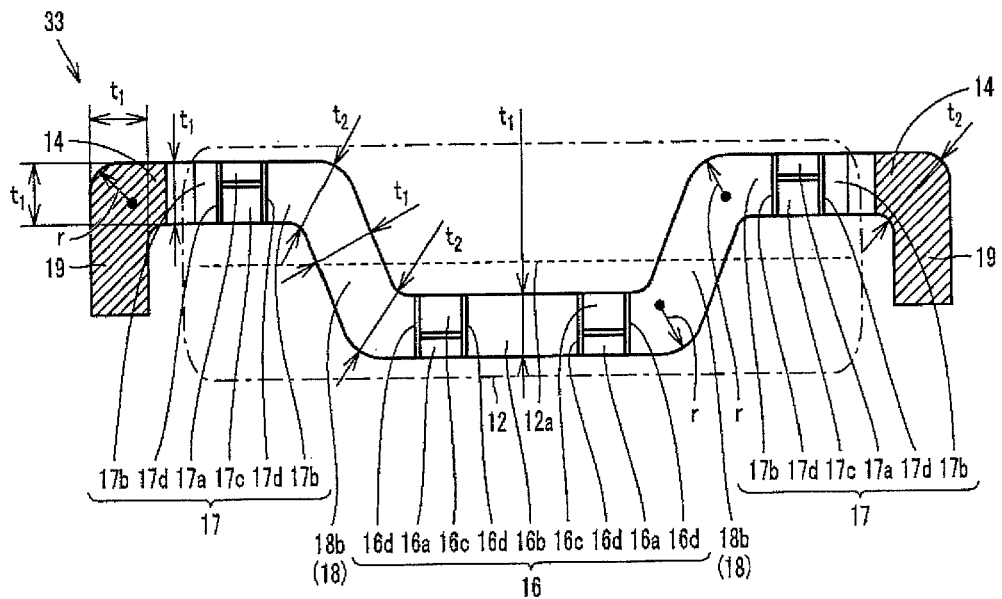
FIG. 20 is a view showing a variation of the roller bearing retainer shown in FIG. 16 and corresponding to FIG. 19.

Next, a production method of the retainer 13 will be described with reference to FIGS. 6 to 15. In addition, FIG. 6 is a flowchart showing main production steps of the retainer 13, FIGS. 7 to 10 are views showing a first step in detail, FIGS. 11 to 14 are views showing a second step in detail, and FIG. 15 is a view showing a third step in detail.

First, as a starting material of the retainer 13, a steel plate (carbon steel) containing 0.15% to 1.1% by weight of carbon is used. More specifically, SCM415 and S50C containing 0.15% to 0.5% by weight of carbon or SAE1070 and SK5 containing 0.5% to 1.1% by weight of carbon are used.

In addition, according to carbon steel containing less than 0.15% by weight of carbon, a carburized layer is not likely to be formed by a quenching process, and it is necessary to perform a nitrocarburizing process in order to obtain hardness required for the retainer 13. Since the nitrocarburizing process is high in plant cost as compared with that of a quenching process that will be described below, the production cost of the needle roller bearing 11 is increased as a result. In addition, according to the carbon steel containing less than 0.15% by weight of carbon, a satisfactory carburized layer is not obtained even by the nitrocarburizing process in some cases, so that surface originated flaking could be generated in an early stage. Meanwhile, according to carbon steel containing more than 1.1% by weight of carbon, its processability is considerably lowered.

In the first step shown in FIG. 6, a cylindrical member 22 is provided from the above steel plate as the starting material (S11). More specifically, referring to FIG. 7, a cup-shaped member 21 is provided from the steel plate by a deep-drawing process. At this time, a bottom wall 21a is formed on one axial side end (upper side in FIG. 7) of the cup-shaped member 21, and an outward flange part 21b is formed at the axial other side end (lower side in FIG. 7) thereof. In addition, at this time, the surface roughness Ra of the outer diameter surface or the inner diameter surface of the cup-shaped member 21 is made to be 0.05 μm to 0.3 μm by an ironing process.

Figure 8:
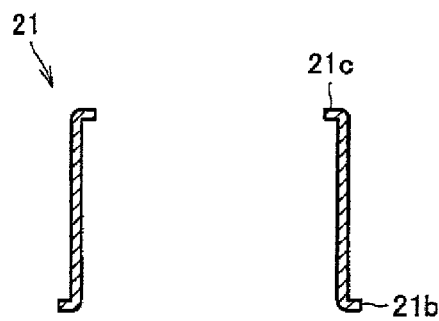
FIG. 8 is a view showing a punching process step.

Next, referring to FIG. 8, the bottom wall 21a of the cup-shaped member 21 is removed by a punching process. Here, it is to be noted that the bottom wall 21a cannot be completely removed by the punching process and an inward flange part 21c is formed at the one axial side end of the cup-shaped member 21.

Figure 9:
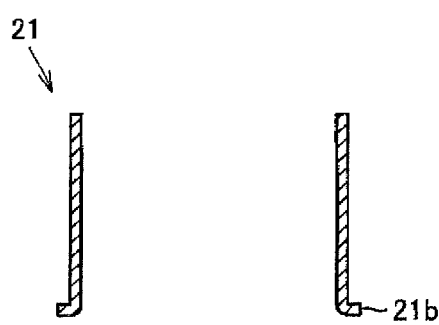
FIG. 9 is a view showing a burring process step.
Figure 10:
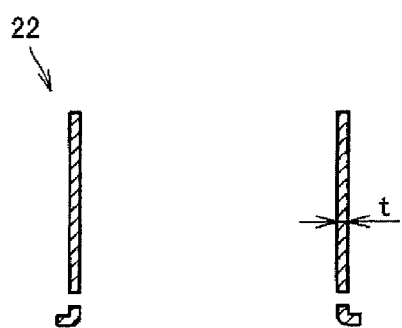
FIG. 10 is a view showing a trimming process step.

Then, referring to FIG. 9, the inward flange part 21c is made straight up in the axial direction by a burring process. Furthermore, referring to FIG. 10, the outward flange part 21b is removed by cutting the other axial side end of the cup-shaped member 21 by a trimming process.

Thus, the cylindrical member 22 is provided. The outer diameter dimension of the cylindrical member 22 provided in the above step corresponds to the outer diameter dimension of the column center part 16. In addition, the thickness of the cylindrical member 22 provided in the above step is "t".

Then, in the second step shown in FIG. 6, the column center part 16, the pair of column end parts 17, and the pair of column sloped parts 18 are formed by deforming the cylindrical member 22 in the radial direction (S12). According to this embodiment, the diameters at both axial ends of the cylindrical member 22 are expanded by use of an expansion pressing outer die 23 (referred to as the "outer die 23" simply hereinafter) to hold the outer diameter surface of the cylindrical member 22, and a pair of expansion pressing inner dies 25 and 26 (referred to as the "inner dies 25 and 26" simply hereinafter) to hold the inner diameter surface of the cylindrical member 22 (expansion pressing).

Referring to FIGS. 11 to 14, the outer die 23 has a cylindrical space 23a to receive the cylindrical member 22 to its inside. The cylindrical space 23a is composed of a small diameter part 23b corresponding to the outer diameter dimension of the column center part 16, a large diameter part 23c corresponding to the outer diameter dimension of the column end part 17, and a sloped part 23d corresponding to the slope angle of the column sloped part 18, between the small diameter part 23b and the large diameter part 23c.

The first inner die 25 is a cylindrical member to be inserted from the one axial side end (upper side in FIG. 11) of the cylindrical member 22. The first inner die 25 is composed of a small diameter part 25a corresponding to the inner diameter dimension of the column center part 16, a large diameter part 25b corresponding to the inner diameter dimension of the column end part 17, and a sloped part 25c corresponding to the slope angle of the column sloped part 18, between the small diameter part 25a and the large diameter part 25b. The second inner die 26 has the same constitution and is inserted from the other axial end (lower side in FIG. 11) of the cylindrical member 22.

The outer die 23 is composed of first to fourth split outer dies 24a, 24b, 24c, and 24d split at the interval of 90° in a radial manner. Each of the first to fourth split outer dies 24a to 24d can be moved in the radial direction of the cylindrical member 22 by a moving tool 27. In addition, each of the first and second inner dies 25 and 26 can be moved in the axial direction of the cylindrical member 22.

Figure 11:
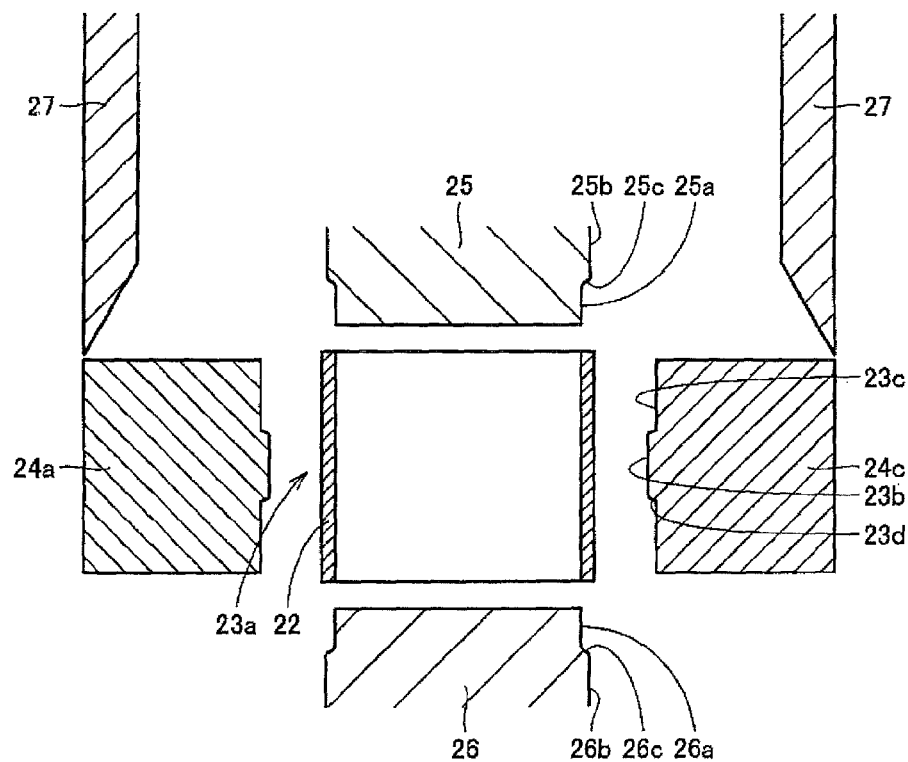
FIG. 11 is a view showing a state before an expansion pressing step is performed.
Figure 12:
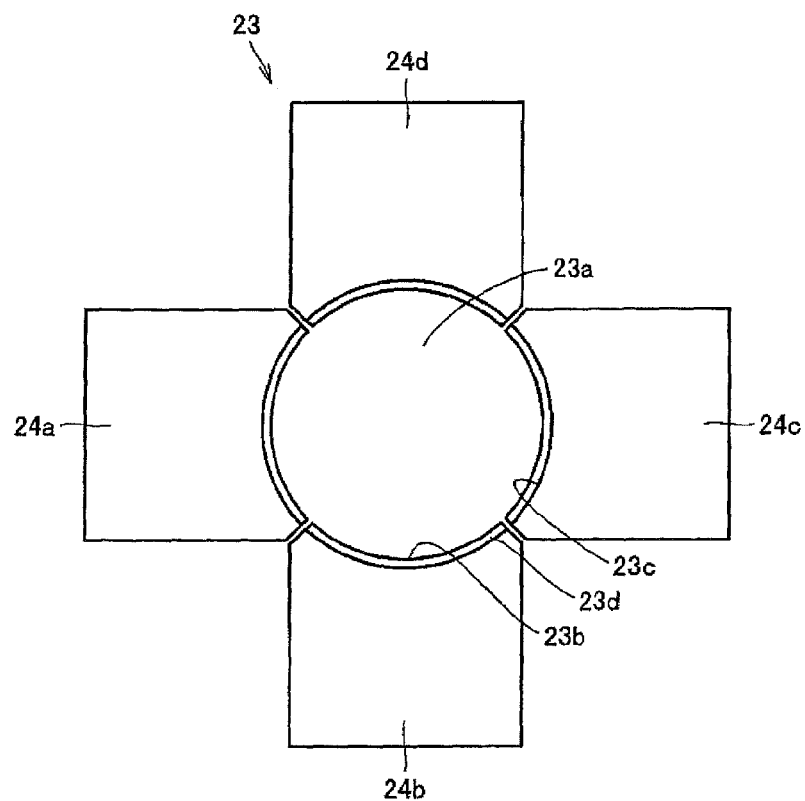
FIG. 12 is a view showing an expansion pressing outer die taken from an axial direction.

Referring to FIG. 11, when the first to fourth split outer dies 24a to 24d are radially retreated and the first and second inner dies 25 and 26 are axially retreated, the cylindrical member 22 can be put in and out from the cylindrical space 23a. Here, the term "retreat" means the movement in the direction getting away from the cylindrical member 22.

Figure 13:
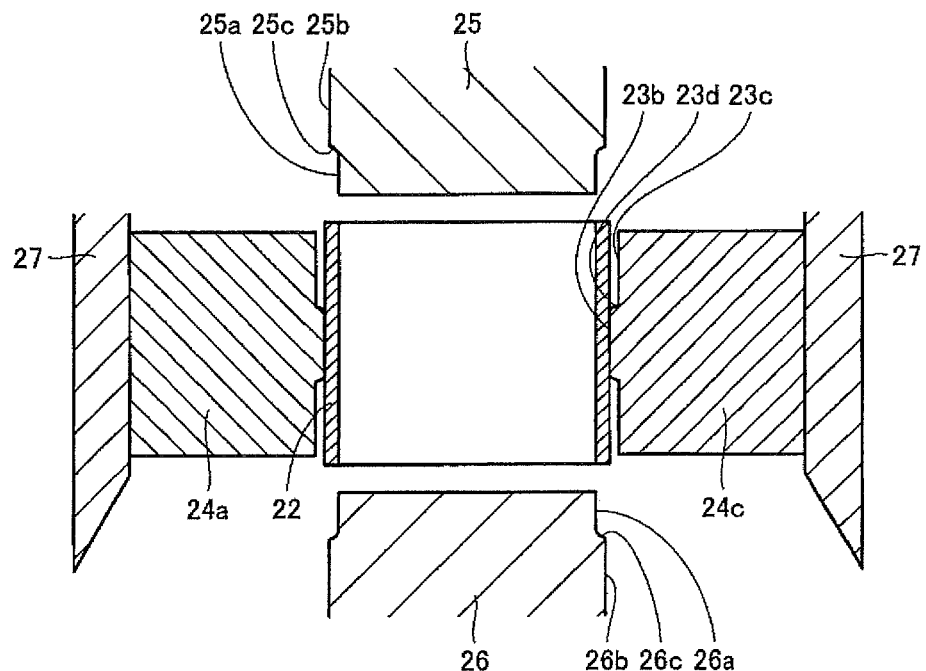
FIG. 13 is a view showing a state in the middle of the process of the expansion pressing step.
Figure 14:
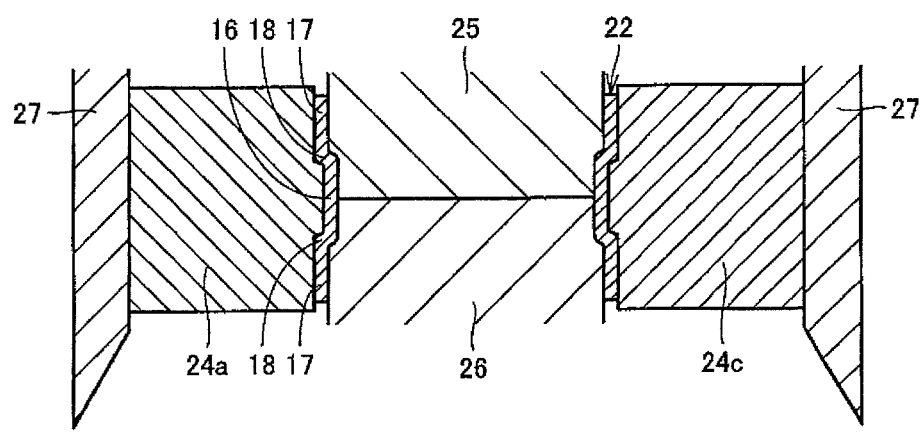
FIG. 14 is a view showing a state after the expansion pressing step has been performed.

Next, referring to FIG. 13, the first to fourth split outer dies 24a to 24d are advanced in the radial direction to hold the outer diameter surface of the cylindrical member 22 by the small diameter part 23b. Then, referring to FIG. 14, the first and second inner dies 25 and 26 are axially advanced to expand both axial ends of the cylindrical member 22 toward the radial outer side by the large diameter parts 25b and 26b and the sloped parts 25c and 26c. Here, the term "advance" means the movement in the direction approaching to the cylindrical member 22.

Thus, the column center part 16, the pair of column end parts 17, and the pair of column sloped parts 18 are formed. In addition, since the cylindrical member 22 is expanded by the expansion pressing, the thickness "$t_1$" of the column center part 16, the pair of column end parts 17, and the pair of column sloped parts 18 after the second step is thinner than the thickness "t" of the cylindrical member 22 ($t_1 < t$).

Then, in the third step shown in FIG. 6, the boundary part is thickened by a thickening process (S13).

Referring to FIG. 15, a pair of cylindrical compression tools 28 and 29 is used in the thickening process. More specifically, both axial end faces of the cylindrical member 22 are compressed from both sides by the pair of compression tools 28 and 29 under the condition that the cylindrical member 22 is held by the outer die 23 and the inner dies 25 and 26 (under the expansion pressing).

At this time, since the inner and outer diameter surfaces of the linear part are held by the outer die 23 and the inner dies 25 and 26, their thicknesses are not changed. Meanwhile, a small space is formed between the boundary parts, and the outer die 23 and the inner dies 25 and 26. Thus, as the axial dimension of the cylindrical member 22 is reduced, only the boundary part is thickened. The thickness "$t_2$" of the boundary part after the third step is thicker than the thickness "t" of the cylindrical member 22 provided in the first step ($t_1 < t < t_2$). Thus, the thickness of the linear part is reduced and the thickness of the boundary part in which the stress is concentrated is selectively increased to improve the strength without increasing the thickness of the column part 15 as a whole to improve the strength. Therefore, the retainer 13 can be light in weight. In addition, at this time, the curvature radius "r" of the boundary part becomes smaller than the thickness "$t_1$" of the linear part at the same time.

Next, in a fourth step shown in FIG. 6, the pocket 20 and the oil grooves 16d and 17d are formed in the cylindrical member 22 (S14). More specifically, the plurality of pockets 20 and oil grooves 16d and 17d are formed in the circumferential surface of the cylindrical member 22 by a punching process by use of a punch and a die. The punch is composed of a rectangular section corresponding to the pocket 20, and a projection section circumferentially projecting from the rectangular section and corresponding to the oil grooves 16d and 17d. Thus, after the punching process has been performed to form the pockets in the cylindrical member 22, the guide surfaces 16b, 17b, and 18b opposed across the pocket are provided in parallel with each other.

Figure 24:
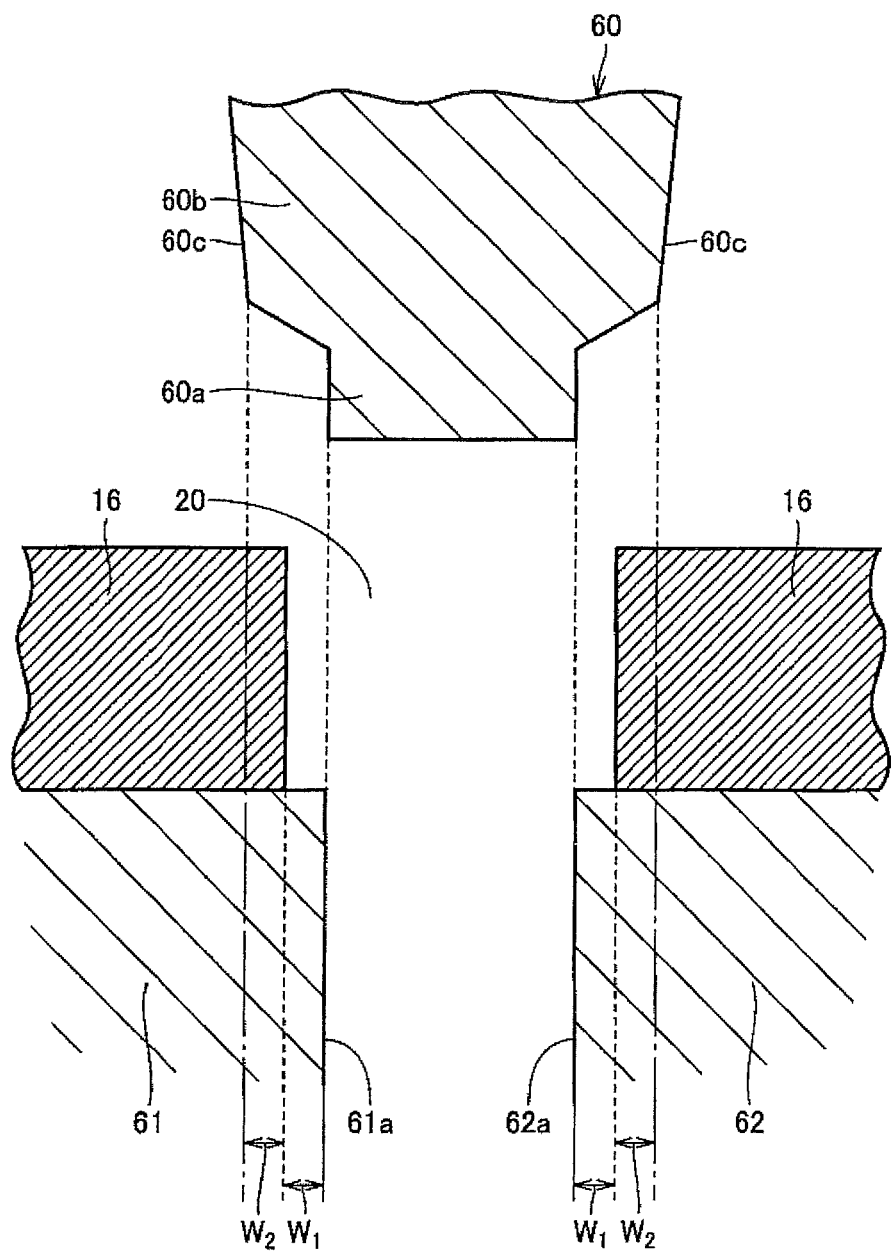
FIG. 24 is a view showing a state before an ironing process.

Then, the first and second roller stopper parts 16a and 17a, the guide surface 16b, 17b, and 18b, and the non-contact parts 16c and 17c are formed by an ironing process. The method for forming the first roller stopper part 16a by the ironing process will be described in detail with reference to FIGS. 24 and 25. FIG. 24 is a view showing a state before the ironing process, and FIG. 25 is a view showing after the ironing process.

First, referring to FIG. 24, at the time of the ironing process, a punch 60 is inserted from the radial outer side of the retainer 13 into the pocket 20, and working bases 61 and 62 support the retainer 13 from the radial inner side of the retainer 13. The punch 60 is composed of a small width part 60a having a width smaller than the circumferential width dimension of the pocket 20 and provided at its tip end, and a large width part 60b having a width larger than the circumferential width dimension of the pocket 20 and provided on its rear end side. An end face 60c of the large width part 60b is sloped such that the circumferential width dimension of the large width part 60b is increased with radial distance from the small width part 60a. The working bases 61 and 62 are arranged such that their end faces 61a and 62a are opposed. At this time, the distance between the end faces 61a and 62a corresponds to the width dimension of the small width part 60a of the punch 60.

The retainer 13 is set between the above punch 60 and the working bases 61 and 62. At this time, the wall surfaces of the column center parts 16 opposed across the pocket 20 are set so as to be retreated from the end faces 61a and 62a of the working bases 61 and 62 by a width $W_1$. In addition, the large width part 60b of the punch 60 is to overlap with the wall surfaces of the column center parts 16 opposed across the pocket 20 by a width $W_2$.

Figure 25:
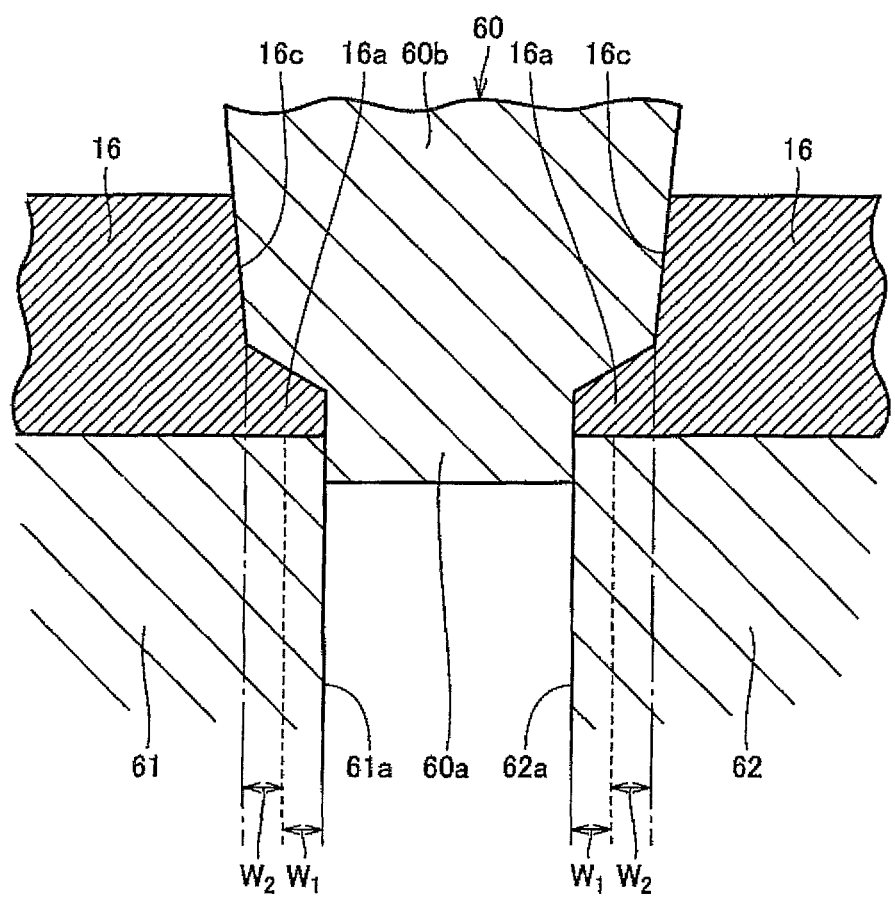
FIG. 25 is a view showing a state after the ironing process.

Next, referring to FIG. 25, the punch 60 is inserted in the pocket 20 to form the first roller stopper part 16a and the non-contact part 16c. More specifically, the region on the radial outer side of the column center part 16 is retreated by the width $W_2$ and becomes the non-contact part 16c. The non-contact part 16c is sloped along the end face 60c of the large width part 60b. In addition, the region on the radial inner side of the column center part 16 is projected by the width $W_1$ and becomes the first roller stopper part 16a.

In addition, when the second roller stopper part 17a and the non-contact part 17c are formed, the punch 60 is set on the radial inner side of the retainer 13, and the working bases 61 and 62 are set on the radial outer side of the retainer 13.

Thus, in the fourth step shown in FIG. 6, the pocket 20 and the oil grooves 16d and 17d are formed and then the first and second roller stopper parts 16a and 17a and the like are formed. Therefore, since the oil grooves 16d and 17d are formed first, when the first and second roller stopper parts 16a and 17a are formed by inserting the punch 60 in the ironing process, the inserted part is prevented from projecting from the guide surfaces 16b, 17b, and 18b.

Thus, in the fourth step shown in FIG. 6, the pocket 20 and the oil grooves 16d and 17d are formed in the cylindrical member 22 (S14). More specifically, the plurality of rectangular pockets 20 and oil grooves 16d and 17d are formed in the circumferential surface of the cylindrical member 22 by the punching process. Then, the first and second roller stopper parts 16a and 17a, the guide surfaces 16b, 17b, and 18b, and the non-contact parts 16c and 17c are formed by the ironing process.

Then, according to a fifth process shown in FIG. 6, a heat treatment is performed to give predetermined mechanical properties such as the surface hardness to the retainer 13 (S15). For the heat treatment, an appropriate method has to be selected based on the carbon contents of the starting material in order that the retainer 13 has a sufficiently deep hardened layer. More specifically, in the case of the material containing 0.15% to 0.5% by weight of carbon, a carburizing quenching process is to be performed, and in the case of the material containing 0.5% to 1.1% by weight of carbon, a bright quenching process or a high-frequency quenching process is to be performed.

The carburizing quenching process is a heat treatment method using a phenomenon in which carbon is soluble in high-temperature steel, so that a surface layer having a large amount of carbon (carburized layer) can be formed while the amount of carbon is small inside. Thus, properties in which the surface is hard and the inside is soft and high in toughness can be provided. In addition, its equipment cost is low as compared with that of the nitrocarburizing process.

According to the bright quenching process, the quenching process is performed by heating up the material in a protective atmosphere or vacuum while preventing the steel surface being oxidized. In addition, its equipment cost is low as compared with those of the nitrocarburizing process and the carburizing quenching process.

According to the high-frequency quenching process, the steel surface is heated up at high speed by use of a principle of induction heating and cooled down immediately to provide a hardened layer. Its equipment cost is considerably low as compared with those of the other quenching processes, and since gas is not used in the heat treatment, it has a merit of being environment favorably. In addition, the process has the advantage that the quenching process can be partially performed.

Furthermore, it is desirable to perform a tempering treatment after the above quenching process in order to reduce residual stress and internal distortion generated in the quenching process and to improve the toughness and stabilize the dimension.

The retainer 13 can be produced through the above processes. In addition, the surface roughness Ra of the outer diameter surface of the retainer 13 has been already 0.05 μm to 0.3 μm in the ironing process in which the cylindrical member 22 is formed (S11). Therefore, it is not necessary to perform a grinding process as a finishing process separately.

Here, according to a conventional welded retainer disclosed in Japanese Patent No. 3665653, a pocket is formed in a band-shaped plate material, a roller stopper part is formed at wall surfaces opposed across the pocket, and then the plate material is annularly formed to provide the retainer. Although the retainer could be broken from a part bonded by welding in this case, according to the present invention, since the retainer 13 is formed from the cylindrical material 22, it is not likely to be broken.

In addition, although the thickness of the column center part 16 is set so as to be substantially equal to that of the column end part 17 in the above embodiment, the thickness of the column end part 17 may be smaller than that of the column center part 16 to improve the oil lubrication property in the axial direction. In this case, the amount of the lubricant oil flowing in the needle roller bearing 11 or flowing out from the needle roller bearing 11 can be increased. As a result, the axial oil lubrication property can be improved. The improvement of the lubrication property contributes to removal of abrasion powder and prevention of temperature rise of the needle roller bearing 11.

In addition, in this case, the thicknesses of the column center part 16 and the column end part 17 can be adjusted by the configuration of the die used in the expansion pressing process (S12) shown in FIGS. 11 to 14. More specifically, the distance between the large diameter part 23c of the outer die 23 and the large diameter parts 25b and 26b of the inner dies 25 and 26 is made to be smaller than the distance between the small diameter part 23b of the outer die 23 and the small diameter parts 25a and 26a of the inner dies 25 and 26. Thus, the thickness of the column end part 17 can be smaller than that of the column center part 16 without adding a new step to the above production steps of the retainer 13.

In addition, although the expansion pressing (S12) has been described as the method for forming the column center part 16, the pair of column end parts 17, and the pair of column sloped parts 18 in the above embodiment, as another method, the diameter of the axial center part of the cylindrical member 22 may be reduced to form the column center part 16, the pair of column end parts 17, and the pair of column sloped parts 18 (contraction pressing). More specifically, the cylindrical member 22 having a diameter dimension corresponding to the outer diameter dimension of the column end part 17 is formed in the step (S11) in which the cylindrical member 22 shown in FIG. 6 is formed. Thus, referring to FIG. 11, as the first and second inner dies 25 and 26 are advanced in the axial direction, the large diameter parts 25b and 26b hold the inner diameter surface of the cylindrical member 22, and a space is formed between the small diameter parts 25a and 26a and the inner diameter surface of the cylindrical member 22. Then, as the first to fourth split outer dies 24a to 24d are advanced in the radial direction, the axial center part of the cylindrical member 22 is contracted into the radial inner side by the small diameter part 23b and the sloped part 23d.

Thus, the column end part 16, the pair of column end parts 17, and the pair of column sloped parts 18 are formed. In this case also, the thickness "$t_1$" of the column center part 16, the pair of column end parts 17, and the pair of column sloped parts 18 after the second step is thinner than the thickness "t" of the cylindrical member 22 ($t_1$<t).

Next, a retainer 33 and its production method according to another embodiment of the present invention will be described with reference to FIGS. 16 to 23. In addition, the same reference numeral is allotted to the component common to the retainer 33 and the retainer 13, and its description will be omitted.

First, referring to FIGS. 16 to 20, the retainer 33 further includes a pair of flange parts 19 extending from the pair of ring parts 14 toward radial inner side. In addition, the thickness of the ring part 14 and the axial thickness of the flange 19 are set to be substantially equal to the thickness "$t_1$" of the other linear part. In addition, the thickness of a boundary part between the ring part 14 and the flange part 19 is set to be substantially equal to the thickness "$t_2$" of the other boundary part. Furthermore, the curvature radius of the boundary part between the ring part 14 and the flange part 19 is set to be substantially equal to the curvature radius r of the other boundary part.

Consequently, the relation of $t_1$<$t_2$ is satisfied in this embodiment also. Thus, in addition to the effect described above, the strength of a root part of the flange part 19 is improved. In addition, the relation of r<$t_1$ is also satisfied. Thus, since the surface area of the outer diameter surface of the ring part 14 is increased, when the retainer 33 is guided on the outer diameter side, the contact surface pressure with the housing can be further reduced. In addition, other constitutions are the same as those of the retainer 13, their description will be omitted.

Among production steps of the above retainer 33, since a first step (S11), a second step (S12), a fourth step (S14), and a fifth step (S15) in FIG. 6 are the same as those of the retainer 13, their description will be omitted. A thickening process (corresponding to S13 in FIG. 6) of the retainer 33 will be described with reference to FIGS. 21 to 23.

According to this embodiment, the thickening process of the boundary part and formation (necking process) of the flange part 19 are performed at the same time. More specifically, the flange part 19 is formed through two stages of a preprocessing step and a post-processing step. Thus, the thickening process and the post-processing step are performed at the same time.

Figure 21:
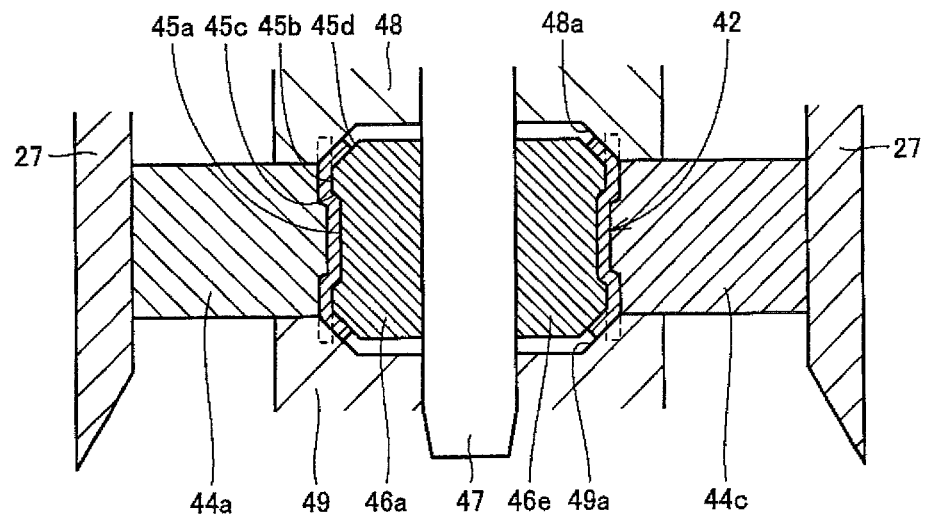
FIG. 21 is a view showing a preprocessing step.

Referring to FIG. 21, in the preprocessing step, axial both ends of a cylindrical member 42 is bent to the inner side to form a predetermined angle (45° in this embodiment) with respect to the column center part 17 to form the flange part 19 by use of a necking outer die 43 (referred to as the "outer die 43" simply hereinafter), a necking inner die 45 (referred to as the "inner die 45" simply hereinafter), and a pair of necking tools 48 and 49.

The outer die 43 has the same constitution as that of the expansion pressing outer die 23, to hold the outer diameter surface of the cylindrical member 42. However, the axial length thereof is shorter than that of the expansion pressing outer die 23 so as not to hold the axial both ends of the cylindrical member 42 to become the flange part 19.

The inner die 45 is a cylindrical member composed of a small diameter part 45a provided at the axial center region of the outer diameter surface and corresponding to the inner diameter dimension of the column center part 16, a large diameter part 45b provided at the axial end region and corresponding to the inner diameter dimension of the column end part 17, a sloped part 45c corresponding to the column sloped part 18, between the small diameter part 45a and the large diameter part 45b, and a necking part 45d provided at a corner part of the axial each end to regulate the bending angle (45°) of the flange part 19 to be provided in the preprocessing step.

Figure 22:
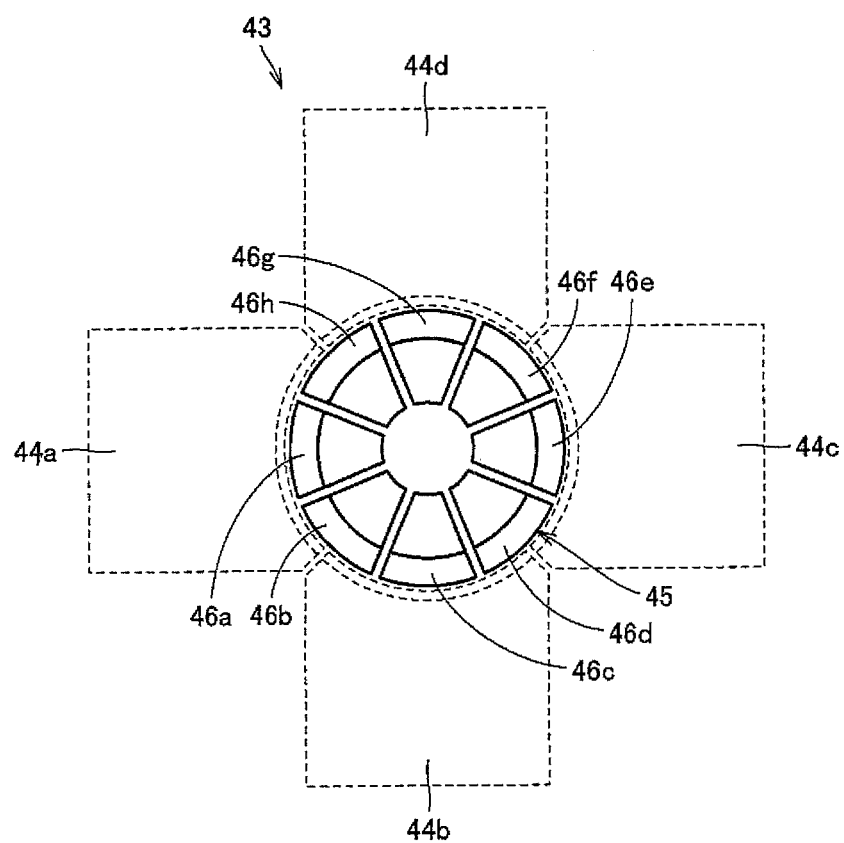
FIG. 22 is a view showing a necking inner die taken from an axial direction.

Referring to FIG. 22, the inner die 45 is composed of first to eighth split inner dies 46a, 46b, 46c, 46d, 46e, 46f, 46g, and

46h split at an angle of 45°, for example in a radial manner. Each of the first to eighth split inner dies 46a to 46h can be moved in the radial direction.

More specifically, when the first to eighth split inner dies 46a to 46h are retreated in the radial direction, the first to eighth split inner dies 46a to 46h can be taken in and out from the cylindrical member 42. Meanwhile, when the first to eighth split inner dies 46a to 46h are advanced in the radial direction, they can hold the inner diameter surface of the cylindrical member 42 (shown in FIG. 21). In addition, the split inner dies 46a to 46h can be advanced by inserting an insertion tool 47.

The necking tool 48 has a necking part 48a at its tip end so as to follow the slope angle (45°) of the flange part 19 to be formed in the preprocessing step, and can be moved in the axial direction of the cylindrical member 42. The necking tool 49 has the same constitution as the above. Thus, when the pair of necking tools 48 and 49 is retreated in the axial direction, the cylindrical member 42 can be taken in and out from the cylindrical space. Meanwhile, when the pair of necking tools 48 and 49 is advanced in the axial direction, axial both ends (shown by a broken line in FIG. 21) of the cylindrical member 42 are bent inward so as to form the predetermined angle (45°).

Figure 23:
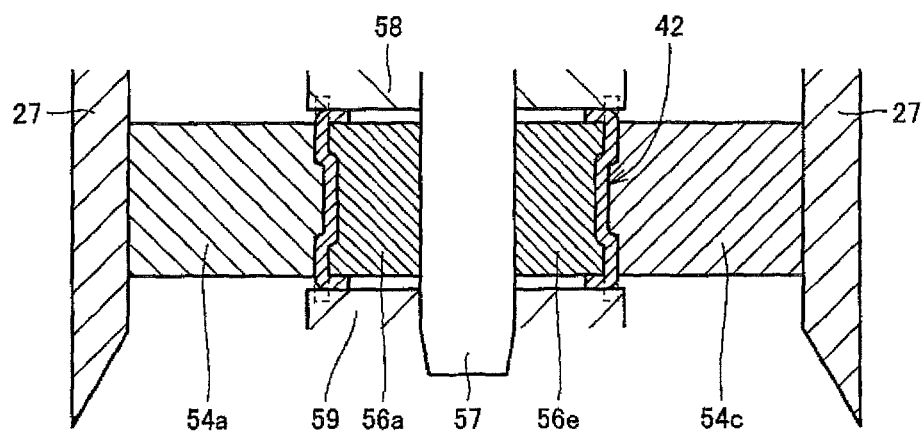
FIG. 23 is a view showing a postprocessing step.

Then, referring to FIG. 23, the flange part 19 is bent to form an angle of 90° with respect to the column end part 17 in the post-processing step. As the process tool in the post-processing step, necking outer dies 54a to 54d (54a and 54c are only shown) having almost the same constitution as those used in the preprocessing step, necking inner dies 56a to 56h (56a and 56e are only shown), an insertion tool 57, and a pair of necking tools 58 and 59 are used. Here, it is to be noted that the necking inner dies 56a to 56h and the pair of necking tools 58 and 59 do not have the necking part at the parts opposed to the flange part 19.

In the post-processing step, by the same procedures as those in the preprocessing step, the inner and outer diameter surfaces of the cylindrical member 42 are held and the flange part 19 is compressed in the axial direction by the necking tools 58 and 59. Thus, the angle of 90° is formed between the column end part 17 and the flange part 19. In addition, the boundary part can be thickened in this step similar to the third step (S13) shown in FIG. 6.

In addition, although the retainers 13 and 33 are formed from the steel plate (flat plate) as the starting material in the above embodiments, a cylindrical member such as a pipe material may be used as the starting material. In this case, the first step (S11) shown in FIG. 6 can be omitted.

Figure 26:
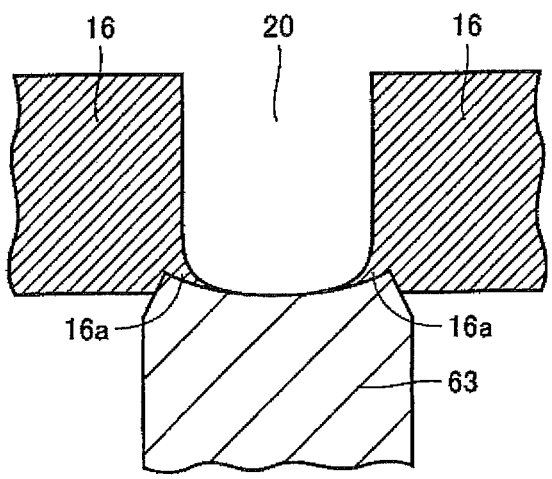
FIG. 26 is a view showing a state in which a first roller stopper part is formed by a caulking process.
Figure 27:
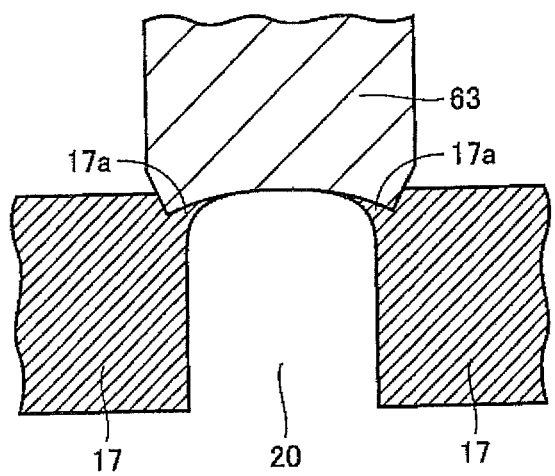
FIG. 27 is a view showing a state in which a second roller stopper part is formed by the caulking process.

In addition, although the first and second roller stopper parts 16a and 17a and the like are formed by the ironing process in the above embodiments, they may be formed by a caulking process. FIG. 26 is a view showing a state in which the first roller stopper part 16a is formed by the caulking process, and FIG. 27 is a view showing a state in which the second roller stopper part 17a is formed by the caulking process.

Referring to FIG. 26, the first roller stopper part 16a is formed by caulking the radial inner side wall surface of the column center part 16 by a caulking tool 63. Referring FIG. 27, the second roller stopper part 17a is formed by caulking the radial outer side wall surface of the column end part 17 by the caulking tool 63. In addition, when the first and second roller stopper parts 16a and 17a are formed by the caulking process, the non-contact parts 16c and 17c are not formed.

In addition, although the cage & roller type of needle roller bearings 11 and 13 are shown in the above embodiments, the present invention can be applied to a needle roller bearing further including an inner ring and/or an outer ring. In addition, although the needle roller 12 is shown as a roller, a cylindrical roller or a long roller can be used instead.

Furthermore, when the needle roller bearings 11 and 31 according to the above embodiments are used as the idler bearing in the car transmission, and as the bearing for the large end of the con-rod of the motorcycle engine, especially advantageous effect can be achieved.

Figure 28:
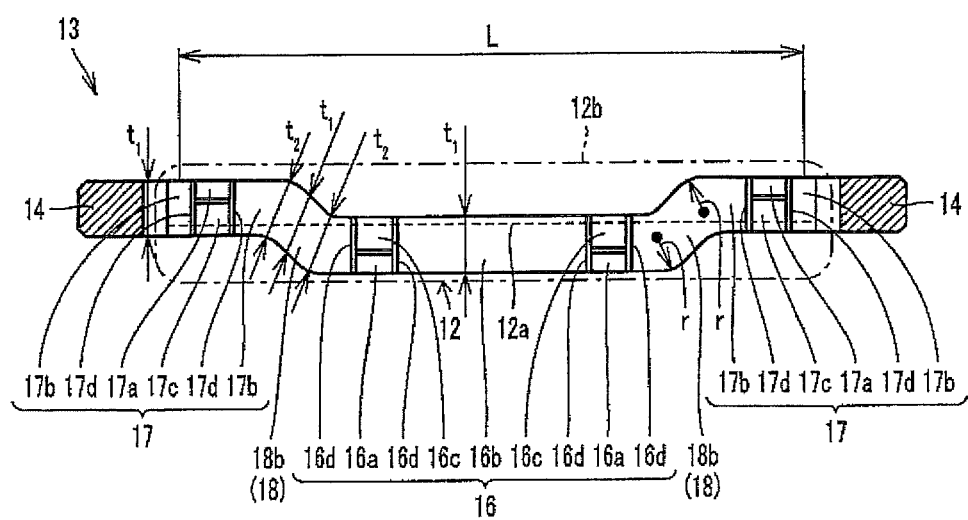
FIG. 28 is a view corresponding to FIG. 4 and showing a part of an effective length L of a needle roller.
Figure 29:
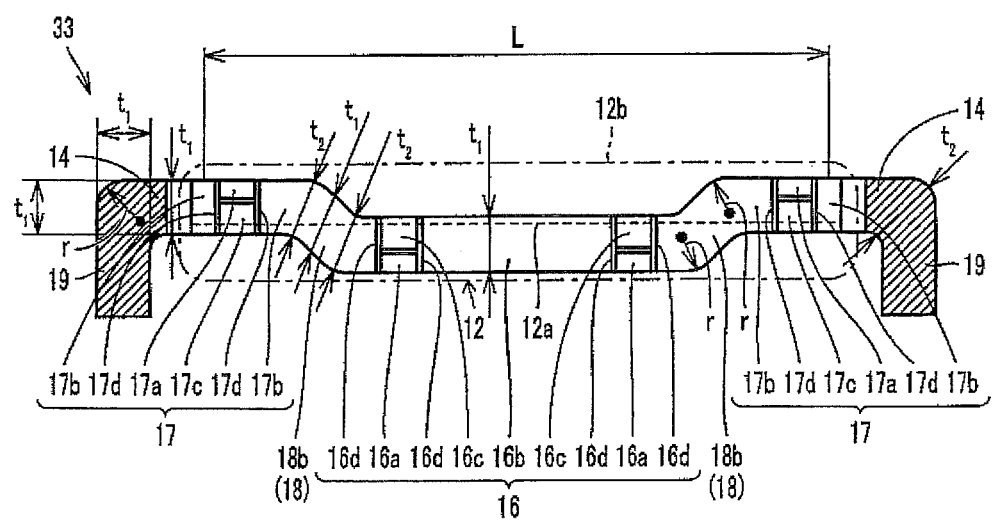
FIG. 29 is a view corresponding to FIG. 19 and showing a part of an effective length L of a needle roller.
Figure 30:
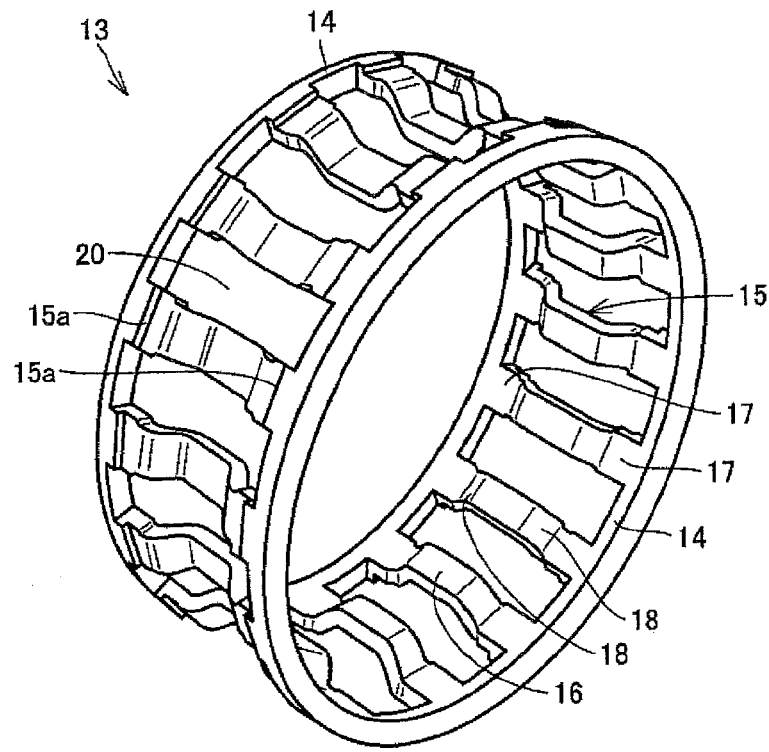
FIG. 30 is a view corresponding to FIG. 1 and showing another embodiment.
Figure 31:
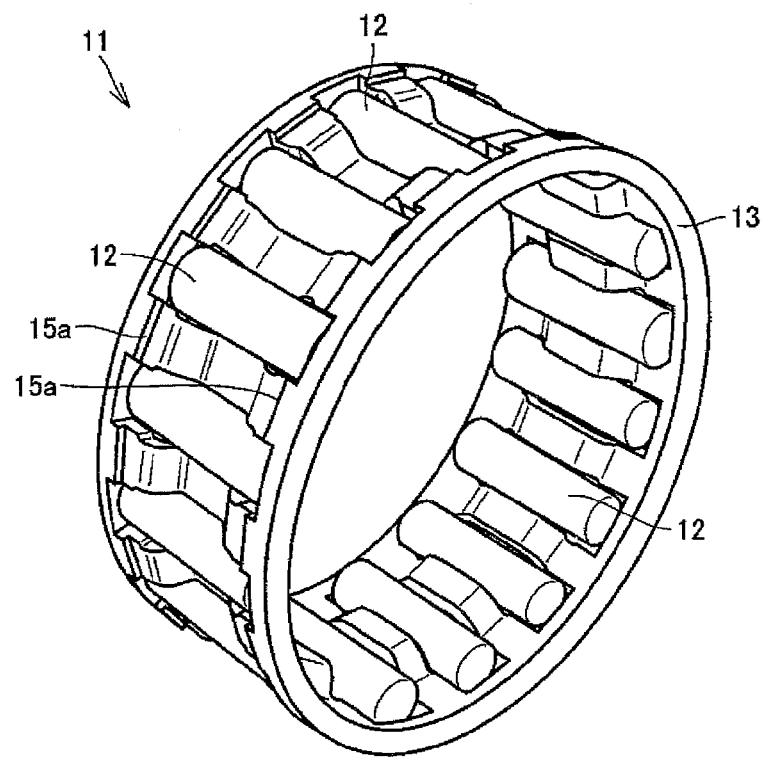
FIG. 31 is a view corresponding to FIG. 2 and showing another embodiment.
Figure 32:
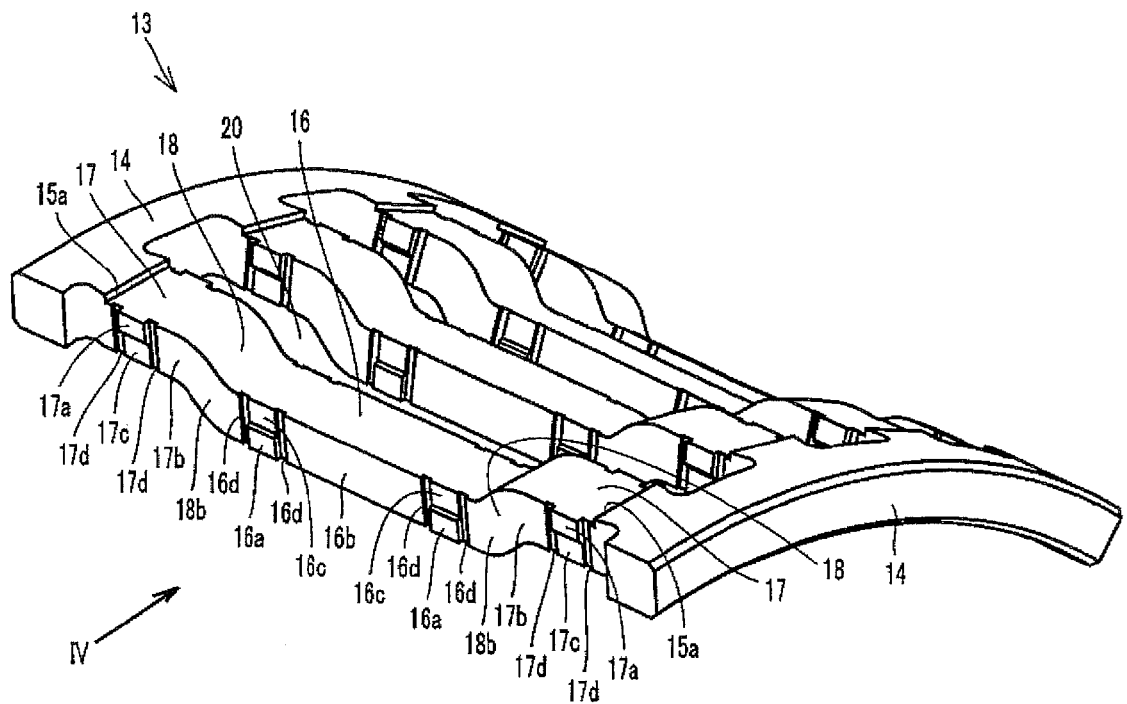
FIG. 32 is a view corresponding to FIG. 3 and showing another embodiment.
Figure 33:
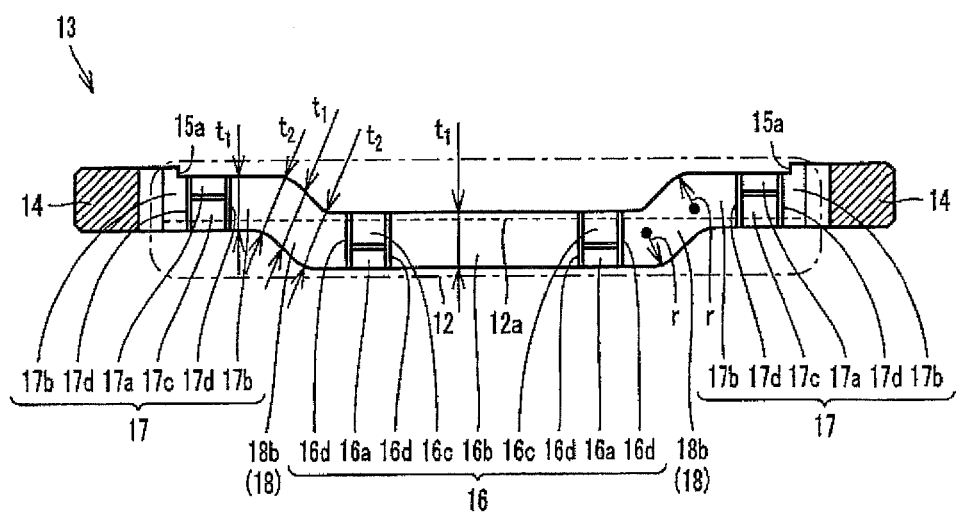
FIG. 33 is a view corresponding to FIG. 4 and showing another embodiment.
Figure 34:
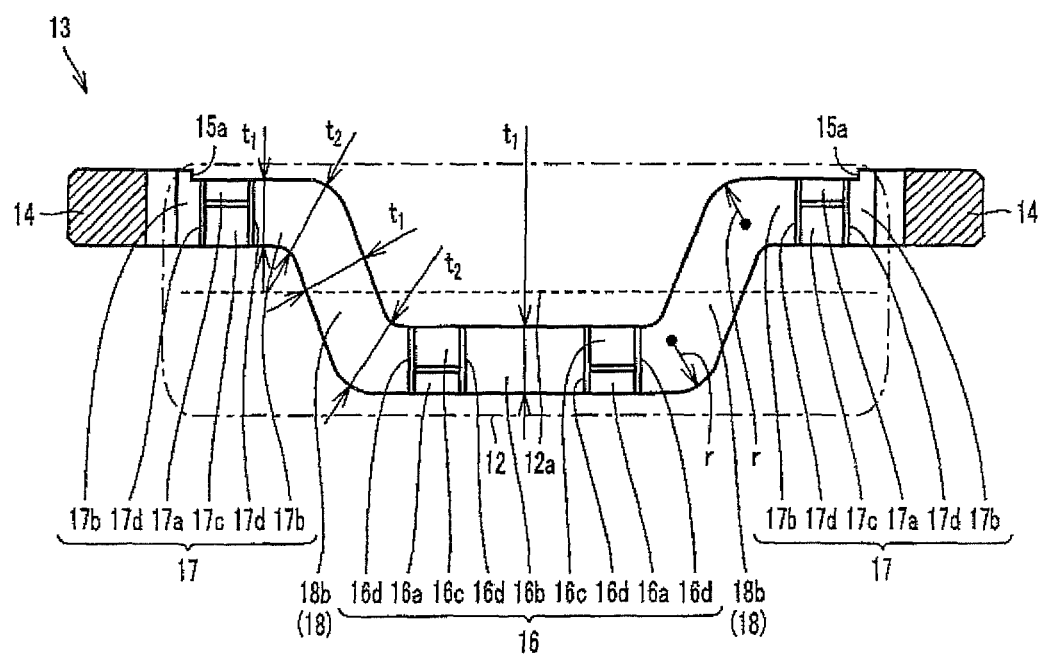
FIG. 34 is a view corresponding to FIG. 5 and showing another embodiment.

According to the needle roller bearing in another embodiment of the present invention, the rolling surface of the roller is in contact with the opposed wall surface of the column part of the retainer, over 50% or more of the effective length of the needle roller. FIGS. 28 and 29 are views showing such embodiment. FIGS. 28 and 29 are sectional views corresponding to FIGS. 4 and 19 in the above embodiments, respectively and the same reference numerals are allotted to the same or similar parts and their detailed description will be omitted. Only the part related to the effective length of the needle roller will be described with reference to FIGS. 28 and 29.

The needle roller 12 is in contact with the guide surfaces 16b, 17b, and 18b over 50% or more of the effective length of the needle roller 12, that is, a length L shown in each of FIGS. 28 and 29. More specifically, as described above, the guide surfaces 16b, 17b, and 18b are provided at the region axially adjacent to the first and second roller stopper parts 16a and 17a, and the outer diameter surface of the column center part 16 is positioned on the radial outer side as compared with the inner diameter surface of the column end part 17. Thus, the pitch circle 12a of the needle roller 12 is positioned on the radial inner side as compared with the outer diameter surface of the column center part 16, and on the radial outer side as compared with the inner diameter surface of the column end part 17. Thus, the needle roller 12 can be in contact with each of the guide surfaces 16b, 17b, and 18b. Therefore, the contact area between the needle roller 12 and the guide surfaces 16b, 17b, and 18b is increased, and the contact surface pressure of the contact part between the needle roller 12 and the column part 15 can be reduced. As a result, the skewing of the needle roller 12 and the abrasion and burning of the guide surfaces 16b, 17b, and 18b can be effectively prevented.

Although the non-contact parts 16c and 17c that are not in contact with the needle roller 12 are provided at the region on the radial outer side of the first roller stopper part 16a and the region on the radial inner side of the second roller stopper part 17a in the above embodiment, they may be guide surfaces provided on the same plane as the guide surfaces 16b, 17b, and 18b and brought in contact with the needle roller 12. In addition, in this case, it is preferable that the lubricant oil can be sufficiently supplied so as not to cut the oil film on the first and second roller stopper parts 16a and 17a.

In addition, although the oil grooves 16d and 17d are provided on axial each side of the first and second roller stopper parts 16a and 17a in the above embodiment, when the radial oil lubrication property is enough, the oil grooves 16d and 17d may not be provided.

In addition, although the description has been made of the case where the needle roller 12 is in contact with the guide surfaces 16b, 17b, and 18b in order to make the contact length be 50% or more of the effective length of the needle roller 12 in the above embodiment, another configuration may be used so that the contact length can be 50% or more of the effective length thereof.

According to a roller bearing retainer in still another embodiment, the pair of column end parts and the pair of ring parts are connected through a stepped part so that the outer diameter surface of the column end part is positioned on the radial inner side as compared with the outer diameter surface of the ring part. FIGS. 30 to 45 show such embodiments. FIGS. 30, 31, 32, 33, 34, 35, 36, 37, 38, 39, 40, 41, 42, 43, 44, and 45 correspond to FIGS. 1, 2, 3, 4, 5, 11, 13, 14, 15, 16, 17, 18, 19, 20, 21, and 23, respectively, and the same reference numerals are allotted to the same or similar components and their description will be omitted.

According to the above embodiment, the outer diameter surface of the column end part 17 is positioned on the radial inner side as compared with the outer diameter surface of the ring part 14. More specifically, as shown in FIGS. 30 to 34, a stepped part 15a is formed between the column end part 17 and the ring part 14. The height of the stepped part 15a is 0.05 mm to 0.3 mm, for example so that the lubricant oil can flow in. In addition, the height of the stepped part 15a is expressed in the drawing with exaggeration to be easily understood. Thus, the space to retain the lubricant oil is formed at the region on the radial outer side of the retainer 13. When the lubricant oil is supplied to each component of the bearing from this region, the lubrication performance of the retainer 13 can be enhanced.

More specifically, when the retainer 13 is guided on the outer diameter side, the outer diameter surface of the ring part 14 is in contact with a housing (not shown). Here, when the lubricant oil is supplied to between the ring part 14 and the housing, the oil film between the retainer 13 and the housing is prevented from being cut to prevent the abrasion and burning of the retainer 13. In addition, when the lubricant oil flows in the pocket 20, the burning between the needle roller 12 and the retainer 13 can be prevented.

In addition, the position of the stepped part 15a is not necessarily positioned at the boundary part between the column end part 17 and the ring part 14 strictly, it may be one-sided in either direction to some extent. However, it is preferable that the stepped part 15a is positioned on the axial outer side as compared with the second roller stopper part 17a. Thus, the lubricant oil can be positively supplied to the second roller stopper part 17a, so that the oil film between the needle roller 12 and the second roller stopper part 17a can be prevented from being cut.

In addition, it is preferable that the stepped part 15a is positioned on the axial inner side as compared with the axial inner side end face (which constitutes the pocket) of the ring part 14. When the stepped part is one-sided in the axial outer direction too much, the contact area with the housing becomes small and the increase of the contact surface pressure becomes not allowable.

According to the above embodiment, in the second step shown in FIG. 6, the cylindrical member 22 is deformed to form the column end part 16, the pair of column end parts 17, and the pair of column sloped parts 18, and the stepped part 15a between the column end part 17 and the ring part 14 so that the outer diameter surface of the pair of column end parts 17 is positioned on the radial inner side as compared with the outer diameter surface of the pair of ring parts 14 (S12). According to this embodiment, the diameters at both axial ends of the cylindrical member 22 are expanded by use of the expansion pressing outer die 23 to hold the outer diameter surface of the cylindrical member 22, and the pair of expansion pressing inner dies 25 and 26 to hold the inner diameter surface of the cylindrical member 22 (expansion pressing).

Figure 35:
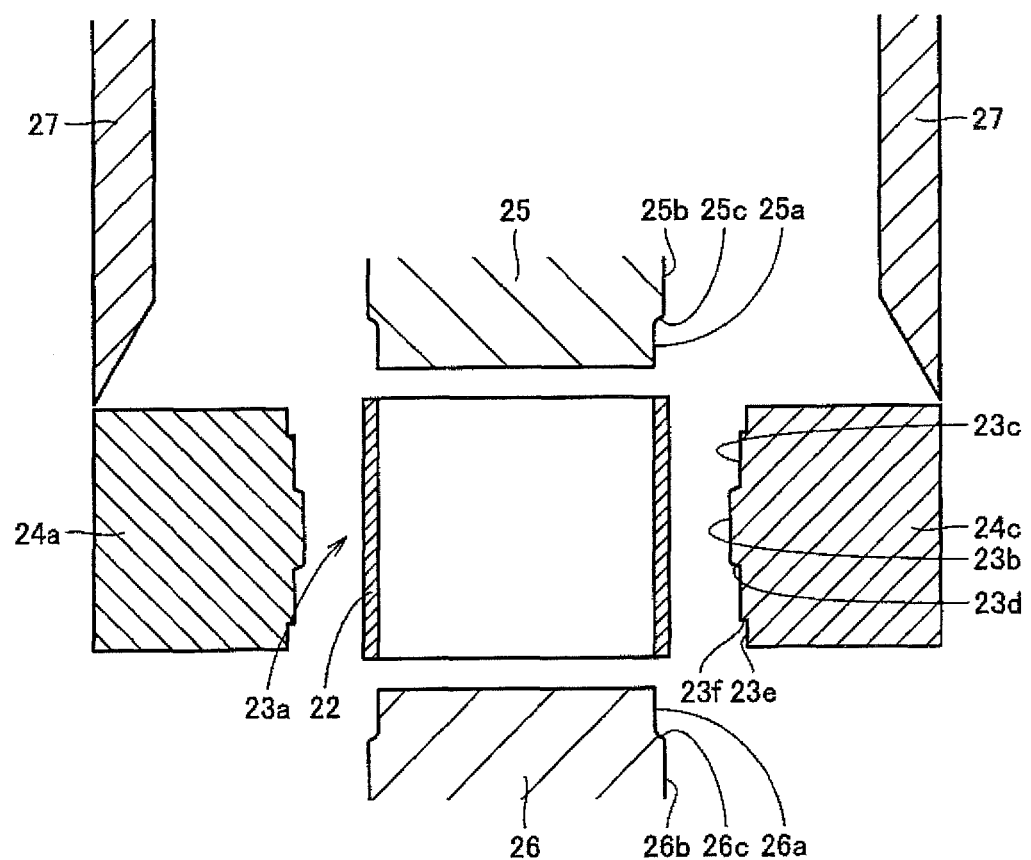
FIG. 35 is a view corresponding to FIG. 11 and showing another embodiment.
Figure 36:
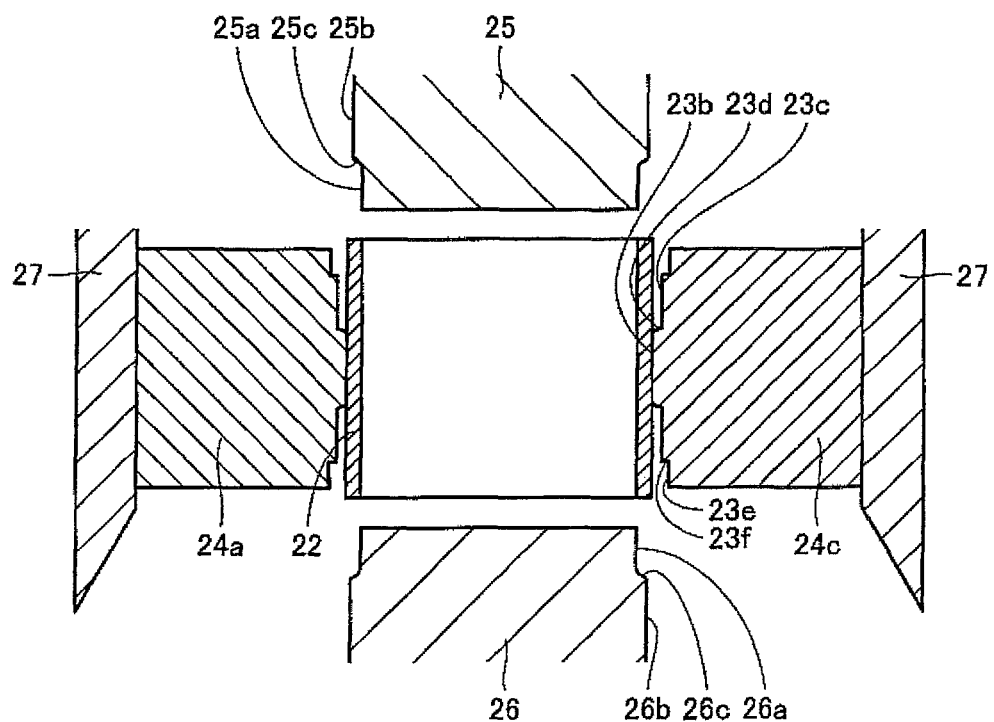
FIG. 36 is a view corresponding to FIG. 13 and showing another embodiment.
Figure 37:
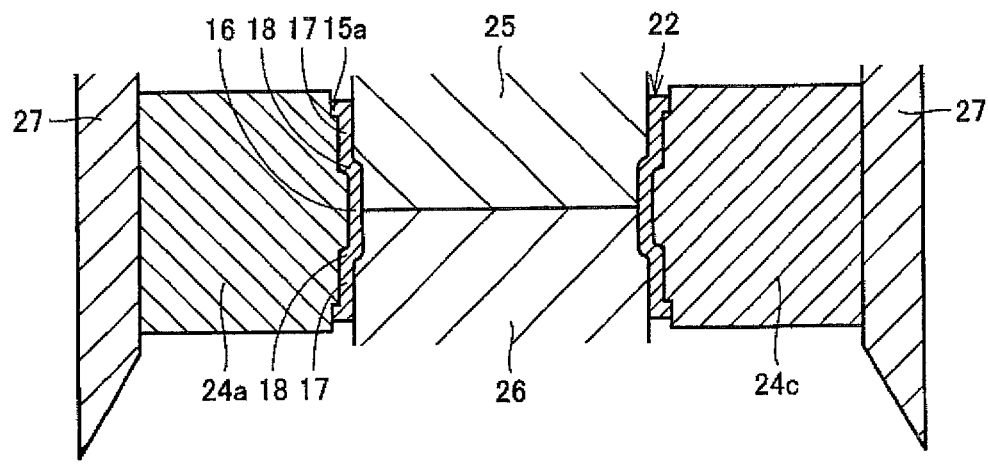
FIG. 37 is a view corresponding to FIG. 14 and showing another embodiment.

Referring to FIGS. 35 to 37, the outer die 23 has the cylindrical space 23a to receive the cylindrical member 22 to its inside. The cylindrical space 23a is composed of the small diameter part 23b corresponding to the outer diameter dimension of the column center part 16, the large diameter part 23c corresponding to the outer diameter dimension of the column end part 17, the sloped part 23d corresponding to the slope angle of the column sloped part 18, between the small diameter part 23b and the large diameter part 23c, an end part 23e corresponding to the outer diameter dimension of the ring part 14, and a stepped part 23f corresponding to the stepped part 15a, between the end part 23e and the large diameter part 23c.

The first inner die 25 is a cylindrical member to be inserted from the one axial side end (upper side in FIG. 35) of the cylindrical member 22. The first inner die 25 is composed of the small diameter part 25a corresponding to the inner diameter dimension of the column center part 16, the large diameter part 25b corresponding to the inner diameter dimension of the column end part 17 and the ring part 14, and the sloped part 25c corresponding to the slope angle of the column sloped part 18, between the small diameter part 25a and the large diameter part 25b. The second inner die 26 has the same constitution as the above and is inserted from the other axial end (lower side in FIG. 35) of the cylindrical member 22.

The outer die 23 is composed of the first to fourth split outer dies 24a, 24b, 24c, and 24d split at the interval of 90° in a radial manner. Each of the first to fourth split outer dies 24a to 24d can be moved in the radial direction of the cylindrical member 22 by the moving tool 27. In addition, each of the first and second inner dies 25 and 26 can be moved in the axial direction of the cylindrical member 22.

Referring to FIG. 35, when the first to fourth split outer dies 24a to 24d are radially retreated and the first and second inner dies 25 and 26 are axially retreated, the cylindrical member 22 can be put in and out from the cylindrical space 23a. Here, the term "retreat" means the movement in the direction getting away from the cylindrical member 22.

Next, referring to FIG. 36, the first to fourth split outer dies 24a to 24d are advanced in the radial direction to hold the outer diameter surface of the cylindrical member 22 by the small diameter part 23b. Then, referring to FIG. 37, the first and second inner dies 25 and 26 are axially advanced to expand both axial ends of the cylindrical member 22 toward the radial outer side by the large diameter parts 25b and 26b and the sloped parts 25c and 26c. Here, the term "advance" means the movement in the direction approaching to the cylindrical member 22.

Thus, the column center part 16, the pair of column end parts 17, and the pair of column sloped parts 18 are formed. In addition, the stepped part 15a is formed at the same time. Thus, since the cylindrical member 22 is expanded by the expansion pressing, the thickness "$t_1$" of the column center part 16, the pair of column end parts 17, and the pair of column sloped parts 18 after the second step is thinner than the thickness "t" of the cylindrical member 22 ($t_1 < t$).

Figure 38:
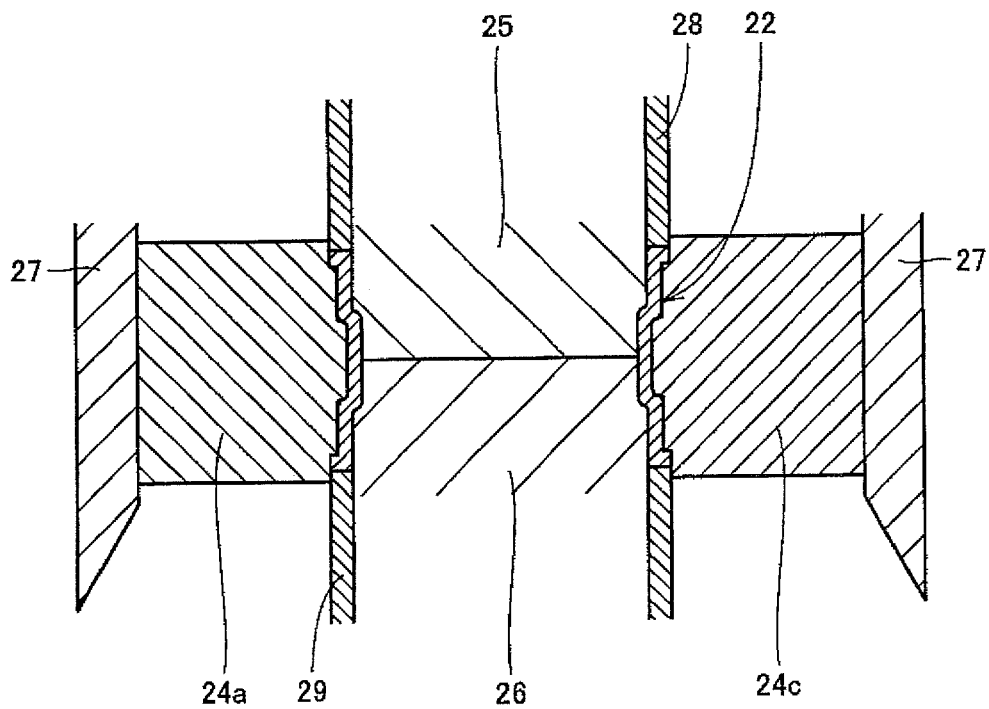
FIG. 38 is a view corresponding to FIG. 15 and showing another embodiment.
Figure 39:
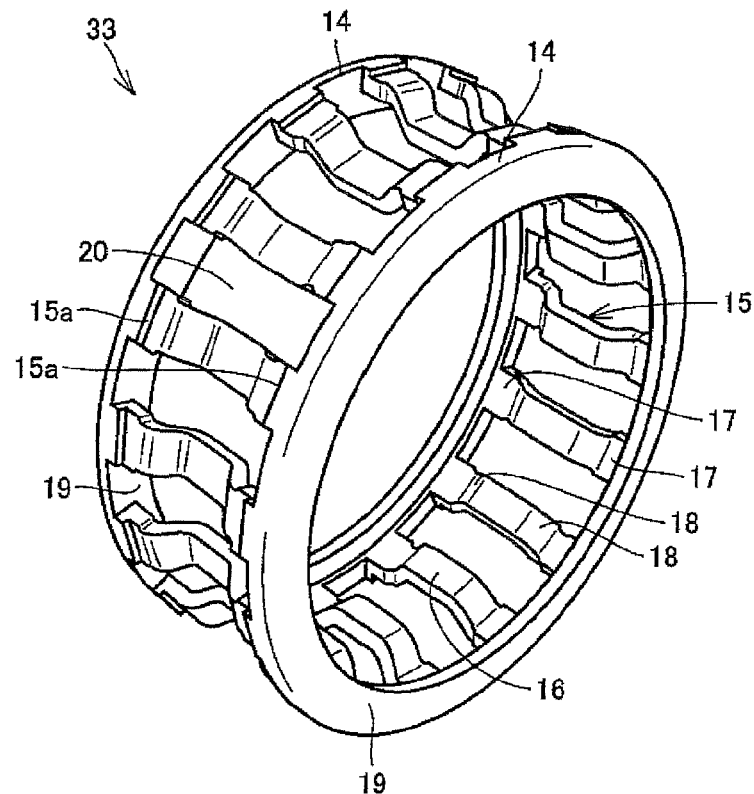
FIG. 39 is a view corresponding to FIG. 16 and showing another embodiment.
Figure 40:
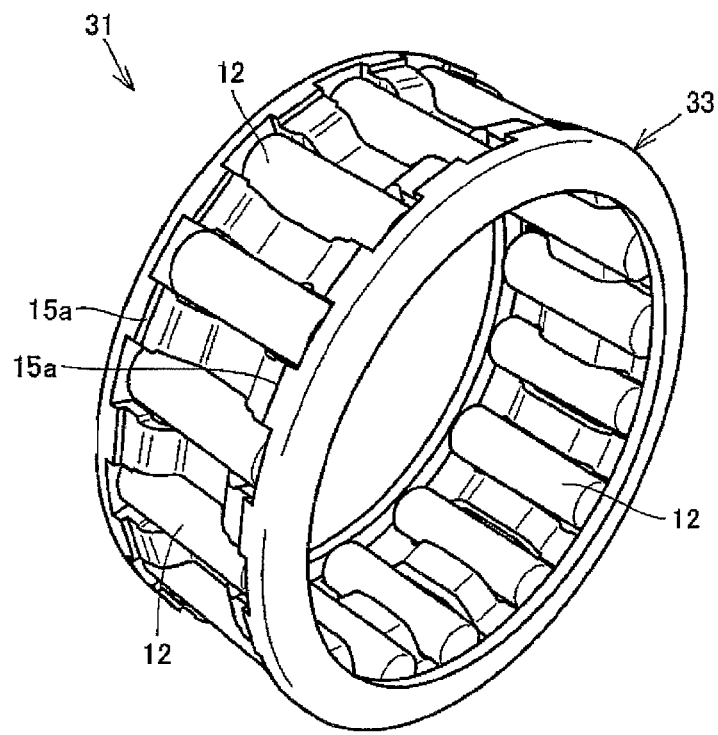
FIG. 40 is a view corresponding to FIG. 17 and showing another embodiment.
Figure 41:
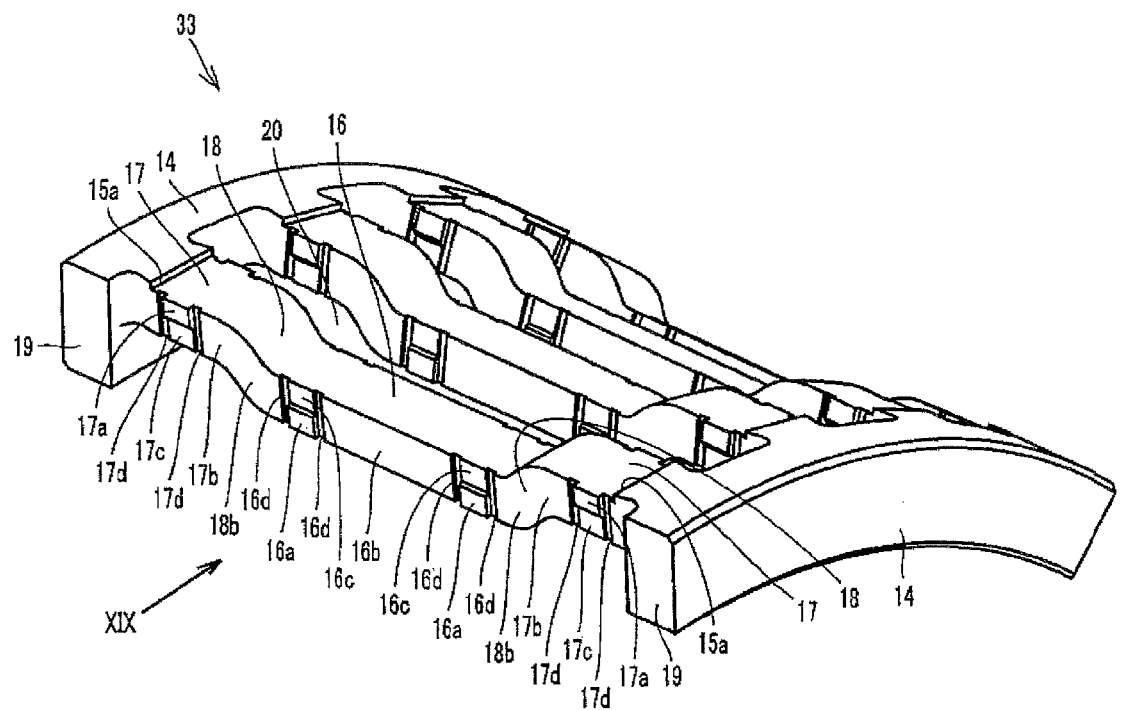
FIG. 41 is a view corresponding to FIG. 18 and showing another embodiment.
Figure 42:
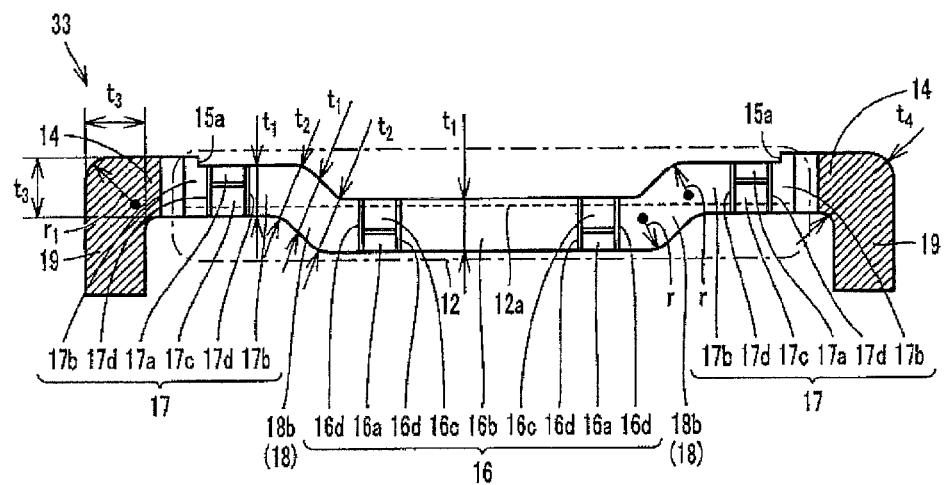
FIG. 42 is a view corresponding to FIG. 19 and showing another embodiment.
Figure 43:
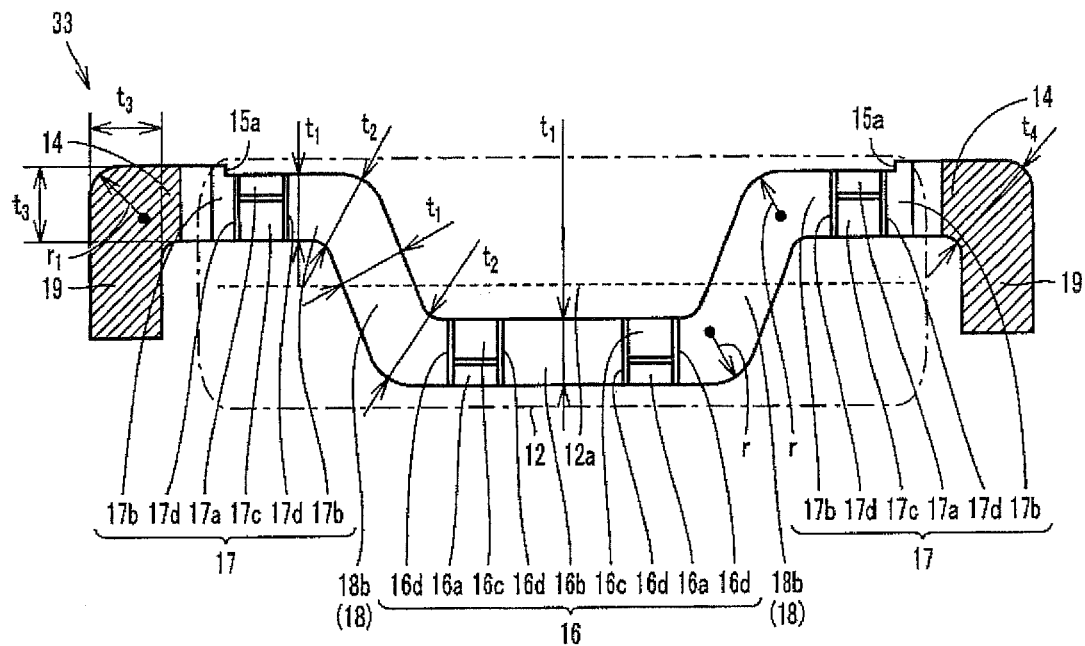
FIG. 43 is a view corresponding to FIG. 20 and showing another embodiment.

Then, in the third step shown in FIG. 6, the boundary part is thickened by the thickening process (S13). Referring to FIG. 38, the pair of cylindrical compression tools 28 and 29 is used in the thickening process. More specifically, both axial end faces of the cylindrical member 22 are compressed from both sides by the pair of compression tools 28 and 29 under the condition that the cylindrical member 22 is held by the outer die 23 and the inner dies 25 and 26 (under the expansion pressing).

At this time, since the inner and outer diameter surfaces of the linear part are held by the outer die 23 and the inner dies 25 and 26, their thicknesses are not changed. Meanwhile, a small space is formed between the boundary parts, and the outer die 23 and the inner dies 25 and 26. Thus, as the axial dimension of the cylindrical member 22 is reduced, only the boundary part is thickened. The thickness "$t_2$" of the boundary part after the third step is thicker than the thickness "t" of the cylindrical member 22 provided in the first step ($t_1 < t < t_2$). Thus, the thickness of the linear part is reduced and the thickness of the boundary part in which the stress is concentrated is selectively increased to improve the strength without increasing the thickness of the column part 15 as a whole to improve the strength. Therefore, the retainer 13 can be light in weight. In addition, at this time, the curvature radius "r" of the boundary part becomes smaller than the thickness "$t_1$" of the linear part at the same time. The following steps are the same as those in the above embodiment.

In addition, although the expansion pressing (S12) has been described as the method for forming the column center part 16, the pair of column end parts 17, and the pair of column sloped parts 18 in the above embodiment, as another method, the diameter of the axial center part of the cylindrical member 22 may be reduced to form the column center part 16, the pair of column end parts 17, and the pair of column sloped parts 18 (contraction pressing). More specifically, the cylindrical member 22 having a diameter dimension corresponding to the outer diameter dimension of the ring part 14 is formed in the step (S11) in which the cylindrical member 22 shown in FIG. 6 is formed. Thus, referring to FIG. 35, as the first and second inner dies 25 and 26 are advanced in the axial direction, the large diameter parts 25b and 26b, the small diameter parts 25a and 26a, and the sloped parts 25c and 26c do not hold the inner diameter surface of the cylindrical member 22, and a space is formed between the inner diameter surface of the cylindrical member 22 and them. Then, as the first to fourth split outer dies 24a to 24d are advanced in the radial direction, the axial center part of the cylindrical member 22 is contracted into the radial inner side by the large diameter part 23c, the small diameter part 23b, and the sloped part 23d.

Thus, the column end part 16, the pair of column end parts 17, and the pair of column sloped parts 18 are formed. In addition, the stepped part 15a is formed at the same time. In this case also, the thickness "$t_1$" of the column center part 16, the pair of column end parts 17, and the pair of column sloped parts 18 after the second step is thinner than the thickness "t" of the cylindrical member 22 ($t_1 < t$).

Next, the retainer 33 and its production method according to another embodiment of the present invention will be described with reference to FIGS. 39 to 45. In addition, the same reference numeral is allotted to the component common to the retainer 33 and the retainer 13 and its description will be omitted.

First, referring to FIGS. 39 to 45, the retainer 33 further includes the pair of flange parts 19 extending from the pair of ring parts 14 toward radial inner side. In addition, a thickness "$t_3$" of the ring part 14 and the axial thickness of the flange 19 is set to be substantially equal. In addition, the thickness "$t_3$" of the ring part 14 and the flange part 19 is smaller than a thickness "$t_4$" of the boundary part between the ring part 14 and the flange part 19 ($t_3 < t_4$). Thus, the strength at the root part of the flange part 19 is improved. In addition, the thickness "$t_3$" of the ring part 14 and the flange part 19, and a curvature radius "$r_1$" of the boundary part between the ring part 14 and the flange part 19 have the relation of $r_1 < t_3$. Thus, since the area of the outer diameter surface of the ring part 14 is increased, when the retainer 33 is guided on the outer diameter side, the contact surface pressure with the housing can be reduced. In addition, other constitutions are the same as those of the retainer 13, their description will be omitted.

Among the production steps of the above retainer 33, the first step (S11), the second step (S12), the fourth step (S14), and the fifth step (S15) in FIG. 6 are same as those of the retainer 13, their description will be omitted. A thickening process (corresponding to S13 in FIG. 6) of the retainer 33 will be described with reference to FIGS. 44 and 45.

According to this embodiment, the thickening process of the boundary part and the formation (necking process) of the flange part 19 are performed at the same time. More specifically, the flange part 19 is formed through two stages of a preprocessing step and a post-processing step. Thus, the thickening process and the post-processing step are performed at the same time.

Figure 44:
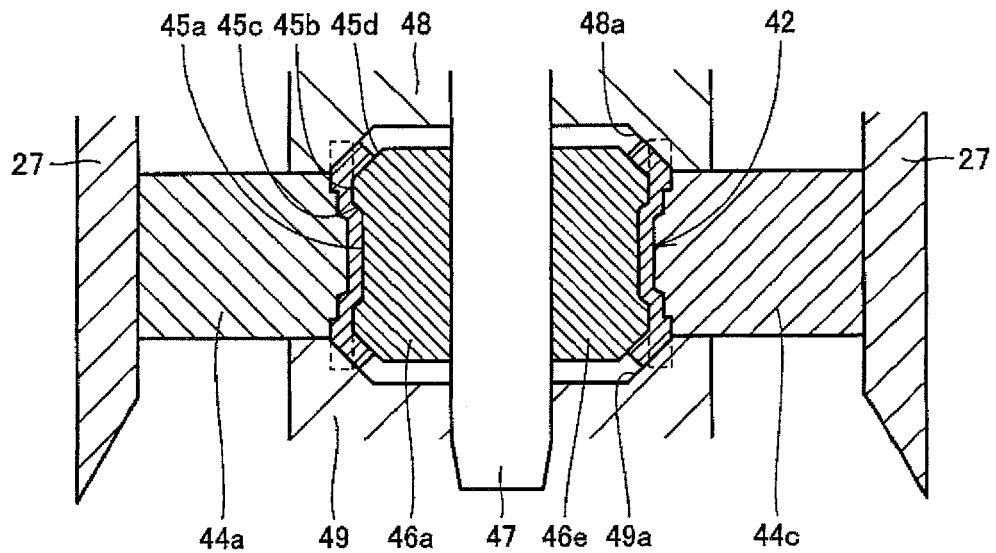
FIG. 44 is a view corresponding to FIG. 21 and showing another embodiment.

Referring to FIG. 44, in the preprocessing step, the axial both ends of the cylindrical member 42 is bent to the inner side to form a predetermined angle (45° in this embodiment) with respect to the column center part 17 to form the flange part 19 by use of the necking outer die 43 (referred to as the "outer die 43" simply hereinafter), the necking inner die 45 (referred to as the "inner die 45" simply hereinafter), and the pair of necking tools 48 and 49.

The outer die 43 has the same constitution as that of the expansion pressing outer die 23 and holds the outer diameter surface of the cylindrical member 42. However, the axial length thereof is shorter than that of the expansion pressing outer die 23 so as not to hold the axial both ends of the cylindrical member 42 to become the flange part 19.

The inner die 45 is a cylindrical member composed of the small diameter part 45a provided at the axial center region of the outer diameter surface and corresponding to the inner diameter dimension of the column center part 16, the large diameter part 45b provided at the axial end region and corresponding to the inner diameter dimension of the column end part 17 and the ring part 14, the sloped part 45c corresponding to the column sloped part 18, between the small diameter part 45a and the large diameter part 45b, and the necking part 45d provided at the corner part of the axial each end to regulate the bending angle (45°) of the flange part 19 to be provided in the preprocessing step.

Referring to FIG. 44, the inner die 45 is composed of the first to eighth split inner dies 46a, 46b, 46c, 46d, 46e, 46f, 46g, and 46h split at an angle of 45°, for example in a radial manner. Each of the first to eighth split inner dies 46a to 46h can be moved in the radial direction.

More specifically, when the first to eighth split inner dies 46a to 46h are retreated in the radial direction, the first to eighth split inner dies 46a to 46h can be taken in and out from the cylindrical member 42. Meanwhile, when the first to eighth split inner dies 46a to 46h are advanced in the radial direction, they can hold the inner diameter surface of the cylindrical member 42 (shown in FIG. 44). In addition, the split inner dies 46a to 46h can be advanced by inserting the insertion tool 47.

The necking tool 48 has the necking part 48a at its tip end so as to follow the slope angle (45°) of the flange part 19 to be formed in the preprocessing step, and can be moved in the axial direction of the cylindrical member 42. The necking tool 49 has the same constitution as the above. Thus, when the pair of necking tools 48 and 49 is retreated in the axial direction, the cylindrical member 42 can be taken in and out from the cylindrical space. Meanwhile, when the pair of necking tools 48 and 49 is advanced in the axial direction, axial both ends (shown by a broken line in FIG. 44) of the cylindrical member 42 can be bent inward so as to form the predetermined angle (45°).

Figure 45:
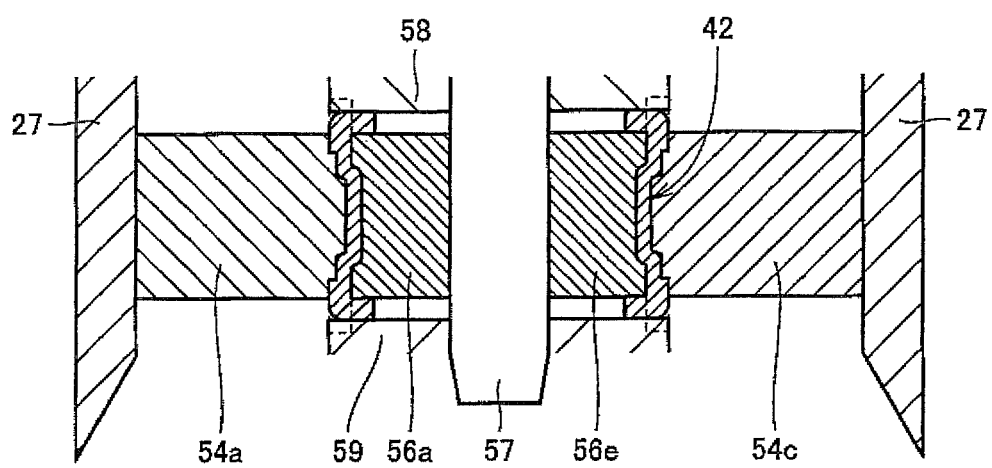
FIG. 45 is a view corresponding to FIG. 23 and showing another embodiment.

Then, referring to FIG. 45, the flange part 19 is bent to form an angle of 90° with respect to the column end part 17 in the post-processing step. As the process tool in the post-processing step, the necking outer dies 54a to 54d (54a and 54c are only shown) having almost the same constitution as those used in the preprocessing step, the necking inner dies 56a to 56h (56a and 56e are only shown), the insertion tool 57, and the pair of necking tools 58 and 59 are used. Here, it is to be noted that the necking inner dies 56a to 56h and the pair of necking tools 58 and 59 do not have the necking part at the parts opposed to the flange part 19.

In the post-processing step, by the same procedures as those in the preprocessing step, the inner and outer diameter surfaces of the cylindrical member 42 are held and the flange part 19 is compressed in the axial direction by the necking tools 58 and 59. Thus, the angle of 90° is formed between the column end part 17 and the flange part 19. In addition, the boundary part can be thickened in this step similar to the third step (S13) shown in FIG. 6.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to the roller bearing retainer, and the needle roller bearing.

What is claimed is:

1. A roller bearing retainer comprising:
a pair of annular ring parts; and
a plurality of column parts each including a column center part provided in an axial center region so as to be positioned relatively on a radial inner side, a pair of column end parts provided in axial end regions so as to be positioned relatively on a radial outer side, and a pair of column sloped parts positioned between said column center part and said pair of column end parts, and connecting said pair of ring parts to each other, wherein
a thickness of each said column center part, each of said pair of column end parts, and each of said pair of column sloped parts is smaller than a thickness of a boundary part located between each column center part and adjacent column sloped parts and between each of said column sloped parts and adjacent column end parts,
at least each of said pair of column sloped parts serve as a roller guide surface, and
wherein the thickness of each said pair of column end parts is smaller than the thickness of each said column center part, and each annular ring part is an integrated ring part continuous in a circumferential direction, and wherein
each said boundary part includes a projection side and a recess side and the thickness of each boundary part designates a length of a line connecting a center part of the projection side and a center part of the recess side.

2. The roller bearing retainer according to claim 1, wherein the thickness of each said column center part, each of said pair of column end parts, and each of said pair of column sloped parts is larger than a curvature radius for each of the boundary parts.

3. The roller bearing retainer according to claim 1, wherein said roller bearing retainer is formed from a steel plate containing 0.15% to 1.1% by weight of carbon.

4. The roller bearing retainer according to claim 1, further comprising a flange part extending from each of said pair of ring parts toward the radial inner side, wherein
a thickness of each of said pair of ring parts and each of said flange parts is smaller than a thickness of another boundary part between each ring part and an adjacent said flange part.

5. The roller bearing retainer according to claim 1, wherein surface roughness Ra of an outer diameter surface of said pair of ring parts and an outer diameter surface of each said pair of column end parts is 0.05 μm to 0.3 μm.

6. The roller bearing retainer according to claim 1, further comprising a flange part extending from each of said pair of ring parts toward the radial inner side, wherein
a thickness of each of said pair of ring parts and each of said flange parts is larger than a curvature radius of another boundary part between each ring part and an adjacent said flange part.

7. The roller bearing retainer according to claim 1, wherein each said column part has a roller stopper part at a wall surface opposed to a pocket to hold the respective roller to prevent the roller from dropping out.

8. The roller bearing retainer according to claim 7, wherein said wall surfaces of said column parts that are opposed circumferentially across each said pocket are parallel to each other.

9. The roller bearing retainer according to claim 7, wherein each said roller stopper part includes a first roller stopper part projecting from each said column center part to prevent the respective roller from dropping out toward the radial inner side, and a second roller stopper part projecting from each of said pair of column end parts to prevent the respective roller from dropping out toward the radial outer side, and
a recess part extending in a radial direction is provided axially on each side of said first and second roller stopper parts.

10. The roller bearing retainer according to claim 9, wherein
a non-contact part opposed to the roller so as to be spaced therefrom by a predetermined clearance is provided at a region adjacent to each of said first and second roller stopper parts in the radial direction, and
said non-contact part is sloped such that said predetermined clearance is increased as a distance from each of said first and second roller stopper parts is increased.

11. The roller bearing retainer according to claim 7, wherein
each said roller stopper part is formed by an ironing process.

12. The roller bearing retainer according to claim 1, wherein
an outer diameter surface of each said pair of column end parts is connected to said pair of ring parts through a stepped part such that the outer diameter surface of each said pair of column end parts is positioned on the radial inner side as compared with an outer diameter surface of said pair of ring parts.

13. The roller bearing retainer according to claim 12, wherein
said each column part has a roller stopper part at a wall surface opposed to a pocket to house a respective roller to prevent the roller from dropping out, and
each said stepped part is positioned on the axial outer side as compared with each said roller stopper part.

14. A method of manufacturing the roller bearing retainer of claim 1, the method comprising:
(a) a step of each forming said pair of column end parts by expanding an axial each end of a cylindrical member having a diameter substantially equal to that of said column center part, and
(b) a step of thickening said boundary parts by axially compressing said cylindrical member.

15. A method of manufacturing the roller bearing retainer of claim 1, the method comprising:
   (a) a step of forming a cylindrical member having a diameter substantially equal to that of each said column center part, from a steel plate by a deep-drawing process, and
   (b) a step of forming at least one of said pair of column end parts by expanding a diameter of an axial each end of said cylindrical member.

16. A needle roller bearing comprising:
   the roller bearing retainer according to claim 1, and
   a plurality of needle rollers contained in pockets of said retainer, wherein one of said plurality of needle rollers is in contact with a wall surface of each column part opposed to a rolling surface of said needle roller, over 50% or more of an effective length of said needle roller.

17. The needle roller bearing according to claim 16, wherein
   a pitch circle of said plurality of needle rollers is positioned on the radial inner side as compared with an outer diameter surface of each said column center part, and positioned on the radial outer side as compared with an inner diameter surface of each said pair of column end parts.

\* \* \* \* \*